US010703843B2

(12) United States Patent
Bloomfield

(10) Patent No.: US 10,703,843 B2
(45) Date of Patent: Jul. 7, 2020

(54) COMPOSITIONS AND METHODS FOR BONDING GLUES, ADHESIVES, AND COATINGS TO SURFACES

(71) Applicant: University of Virginia Patent Foundation, Charlottesville, VA (US)

(72) Inventor: Louis A. Bloomfield, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 158 days.

(21) Appl. No.: 15/533,566

(22) PCT Filed: Dec. 7, 2015

(86) PCT No.: PCT/US2015/064275
§ 371 (c)(1),
(2) Date: Jun. 6, 2017

(87) PCT Pub. No.: WO2016/094306
PCT Pub. Date: Jun. 16, 2016

(65) Prior Publication Data
US 2017/0362363 A1 Dec. 21, 2017

Related U.S. Application Data

(60) Provisional application No. 62/088,728, filed on Dec. 8, 2014.

(51) Int. Cl.
 C08F 222/32 (2006.01)
 B05D 3/10 (2006.01)
 (Continued)

(52) U.S. Cl.
 CPC ........... *C08F 222/32* (2013.01); *B05D 3/101* (2013.01); *B05D 7/02* (2013.01); *B05D 7/51* (2013.01);
 (Continued)

(58) Field of Classification Search
 CPC ......... C08F 222/32; B05D 3/101; B05D 7/02; B05D 7/51; C09D 4/00; C09J 5/02; C09J 4/00
 See application file for complete search history.

(56) References Cited

U.S. PATENT DOCUMENTS 4,316,830 A   2/1982  Mallon
5,478,867 A  12/1995  Tabor
(Continued)

FOREIGN PATENT DOCUMENTS

EP   0 315 836 A2   5/1989
WO   WO 92/09651    6/1992

OTHER PUBLICATIONS

N.J. Mills Polymer Foams Handbook Chapter 1 Introduction to Polymer Foam Microstructure. pp. 1-18. (Year: 2007).*
(Continued)

*Primary Examiner* — John E Uselding
(74) *Attorney, Agent, or Firm* — Finnegan, Henderson, Farabow, Garrett & Dunner, LLP

(57) ABSTRACT

The present application provides compositions and methods for allowing surfaces such as HDPE, LDPE, polyethylene, polypropylene, Teflon (polytetrafluoroethylene), SBS, SEBS, SIS elastomers, and silicone rubber, which are notoriously difficult to apply adhesives, glues, or coatings to, to be treated with a Primer System comprising a cyanoacrylate monomer and non-polar solvent component and an initiator component, wherein the polymerization product of the components is a microstructured polycyanoacrylate layer. The microstructured polycyanoacrylate layer-increases the ability of a glue, adhesive, or coating to adhere to that surface and subsequently allows other materials to be used as coatings on the surface or to be applied using a glue or adhesive.

18 Claims, 22 Drawing Sheets

Figure 1:
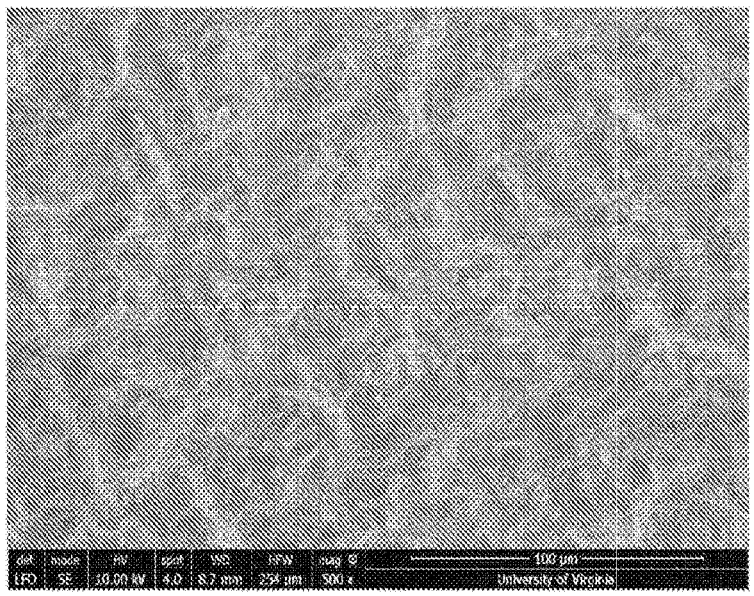

(51) Int. Cl.
  *B05D 7/02*  (2006.01)
  *B05D 7/00*  (2006.01)
  *C09J 5/02*  (2006.01)
  *C09D 4/00*  (2006.01)
  *C09J 4/00*  (2006.01)
(52) U.S. Cl.
  CPC .................................... *C09D 4/00* (2013.01); *C09J 4/00* (2013.01); *C09J 5/02* (2013.01)

(56) References Cited

U.S. PATENT DOCUMENTS

| | | |
|---|---|---|
| 6,335,391 B1 | 1/2002 | Matsumoto et al. |
| 6,995,227 B2 | 2/2006 | Ryan et al. |
| 2003/0157337 A1 | 8/2003 | Abend |
| 2005/0181170 A1 | 8/2005 | Fearing et al. |
| 2007/0172989 A1 | 7/2007 | Rosini |
| 2007/0185229 A1 | 8/2007 | Badejo et al. |
| 2009/0311773 A1 | 12/2009 | Schick et al. |

OTHER PUBLICATIONS

Ghasaban et al. Photo-crosslinkable cyanoacrylate bioadhesive: Shrinkage kinetics, dynamic mechanical properties, and biocompatibility of adhesives containing TMPTMA and POSS nanostrtuctures as crosslinking agents. Journal of Biomedical Materials Research A. Nov. 2011, vol. 99A, Issue 2 (Year: 2011).*

International Search Report and Written Opinion dated Feb. 11, 2016, in International PCT Application No. PCT/US2015/064275, filed Dec. 7, 2015.

* cited by examiner 140616-22 Material: HDPE, 10 mm x 100 mm strips, MeOH wiped
    Primer A: 0.5% DABCO n-heptane
    Procedure: 1 dip
    Delay: 30 seconds
    Primer B: Saturated cyanoacrylate (EZ-Bond Thin Instant Glue) in n-heptane
    Procedure: 1 dip, 1 wipe, then 1 dip, long wipe until essentially dry.
    Delay: 30 seconds
    Glue: Eclectic E6000
    Procedure: Lean coating, then spring clamp
    Duration: 30 seconds
    Result: Shear Strength = 1.42 MPa

FIG. 3A 140616-23 Material: HDPE, 10 mm x 100 mm strips, MeOH wiped
    Primer A: 1.0% DABCO & 5.0% AIP in n-heptane
    Procedure: 1 dip
    Delay: 30 seconds
    Primer B: Saturated cyanoacrylate (EZ-Bond Thin Instant Glue) in n-heptane
    Procedure: 1 dip, 1 wipe, then 1 dip, long wipe until essentially dry.
    Delay: 30 seconds
    Glue: Eclectic E6000
    Procedure: Lean coating, then spring clamp
    Duration: 30 seconds
    Result: Shear Strength = 1.67 MPa

FIG. 3B 140616-24 Material: HDPE, 10 mm x 100 mm strips, MeOH wiped
Primer A: 1.0% DABCO & 1.0% AIP in Cyclohexane
Procedure: 1 dip
Delay: 30 seconds
Primer B: Saturated cyanoacrylate (EZ-Bond Thin Instant Glue) in n-heptane
Procedure: 1 dip, 1 wipe, then 1 dip, long wipe until essentially dry.
Delay: 30 seconds
Glue: Eclectic E6000
Procedure: Lean coating, then spring clamp
Duration: 30 seconds
Result: Shear Strength = 1.29 MPa

FIG. 3C 140616-25 Material: HDPE, 10 mm x 100 mm strips, MeOH wiped
Primer A: 1.0% DBU in n-heptane
Procedure: 1 dip
Delay: 30 seconds
Primer B: Saturated cyanoacrylate (EZ-Bond Thin Instant Glue) in n-heptane
Procedure: 1 dip, 1 wipe, then 1 dip, long wipe until essentially dry.
Delay: 30 seconds
Glue: Eclectic E6000
Procedure: Lean coating, then spring clamp
Duration: 30 seconds
Result: Shear Strength = 1.97 MPa

FIG. 3D

140616-26 Material: HDPE, 10 mm x 100 mm strips, MeOH wiped
   Primer A: 1.0% TDA in n-heptane
   Procedure: 1 dip
   Delay: 30 seconds
   Primer B: Saturated cyanoacrylate (EZ-Bond Thin Instant Glue) in n-heptane
   Procedure: 1 dip, 1 wipe, then 1 dip, long wipe until essentially dry.
   Delay: 30 seconds
   Glue: Eclectic E6000
   Procedure: Lean coating, then spring clamp
   Duration: 30 seconds
   Result: Shear Strength = 0.88 MPa

FIG. 3E 140616-27 Material: HDPE, 10 mm x 100 mm strips, MeOH wiped
   Primer A: Loctite 770
   Procedure: 1 dip
   Delay: 30 seconds
   Primer B: Saturated cyanoacrylate (EZ-Bond Thin Instant Glue) in n-heptane
   Procedure: 1 dip, 1 wipe, then 1 dip, long wipe until essentially dry.
   Delay: 30 seconds
   Glue: Eclectic E6000
   Procedure: Lean coating, then spring clamp
   Duration: 30 seconds
   Result: Shear Strength = 1.61 MPa

FIG. 3F 140617-3 Material: HDPE, 10 mm x 100 mm strips, MeOH wiped
Primer A: 1.0% DBU in n-heptane
Procedure: 2 dips
Delay: 30 seconds
Primer B: Saturated cyanoacrylate (EZ-Bond Thin Instant Glue) in n-heptane
Procedure: 1 dip, 1 wipe, then 1 dip, long wipe until essentially dry.
Delay: 30 seconds
Glue: Eclectic E6000
Procedure: Lean coating, then spring clamp
Duration: 30 seconds
Result: Shear Strength = 2.31 MPa

FIG. 3G

140617-4 Material: LDPE, 10 mm x 100 mm strips, MeOH wiped
    Primer A: 1.0% DBU in n-heptane
    Procedure: 2 dips
    Delay: 30 seconds
    Primer B: Saturated cyanoacrylate (EZ-Bond Thin Instant Glue) in n-heptane
    Procedure: 1 dip, 1 wipe, then 1 dip, long wipe until essentially dry.
    Delay: 30 seconds
    Glue: Eclectic E6000
    Procedure: Lean coating, then spring clamp
    Duration: 30 seconds
    Result: Shear Strength = 1.23 MPa

FIG. 3H 140617-5 Material: TEFLON, 10 mm x 100 mm strips, MeOH wiped
  Primer A: 1.0% DBU in n-heptane
  Procedure: 2 dips
  Delay: 30 seconds
  Primer B: Saturated cyanoacrylate (EZ-Bond Thin Instant Glue) in n-heptane
  Procedure: 1 dip, 1 wipe, then 1 dip, long wipe until essentially dry.
  Delay: 30 seconds
  Glue: Eclectic E6000
  Procedure: Lean coating, then machinist's vise
  Duration: 30 seconds
  Result: Shear Strength = 0.64 MPa

FIG. 31

140617-6 Material: HDPE, 10 mm x 100 mm strips, MeOH wiped
Primer A: 1.0% DBU in n-heptane
Procedure: 2 dips
Delay: 30 seconds
Primer B: Saturated cyanoacrylate (EZ-Bond Thin Instant Glue) in n-heptane
Procedure: 1 dip, 1 wipe, then 1 dip, long wipe until essentially dry.
Delay: 30 seconds
Glue: Devcon 5-min Epoxy
Procedure: Lean coating, then spring clamp
Duration: 30 seconds
Result: Shear Strength = 3.56 MPa

FIG. 3J 140617-7 Material: LDPE, 10 mm x 100 mm strips, MeOH wiped
  Primer A: 1.0% DBU in n-heptane
  Procedure: 2 dips
  Delay: 30 seconds
  Primer B: Saturated cyanoacrylate (EZ-Bond Thin Instant Glue) in n-heptane
  Procedure: 1 dip, 1 wipe, then 1 dip, long wipe until essentially dry.
  Delay: 30 seconds
  Glue: Devcon 5-min Epoxy
  Procedure: Lean coating, then spring clamp
  Duration: 30 seconds
  Result: Shear Strength = 2.21 MPa

FIG. 3K 140617-8 Material: TEFLON, 10 mm x 100 mm strips, MeOH wiped
   Primer A: 1.0% DBU in n-heptane
   Procedure: 2 dips
   Delay: 30 seconds
   Primer B: Saturated cyanoacrylate (EZ-Bond Thin Instant Glue) in n-heptane
   Procedure: 1 dip, 1 wipe, then 1 dip, long wipe until essentially dry.
   Delay: 30 seconds
   Glue: Devcon 5-min Epoxy
   Procedure: Lean coating, then spring clamp
   Duration: 30 seconds
   Result: Shear Strength = 1.84 MPa

FIG. 3L

140619-3 Material: TEFLON, 10 mm x 100 mm strips, MeOH wiped
   Primer A: 1.0% DBU in n-heptane
   Procedure: 1 dip
   Delay: 30 seconds
   Primer B: Saturated cyanoacrylate (EZ-Bond Thin Instant Glue) in Hexanes
   Procedure: 1 dip, wipes for cloudy
   Delay: 30 seconds
   Glue: EZ-Bond CA (5 cps)
   Procedure: 1 drop, pressed together by hand for 20 seconds, then clamp
   Duration: 30 seconds
   Result: Shear Strength = 2.38 MPa

FIG. 3M

140619-9 Material: HDPE, 10 mm x 100 mm strips, MeOH wiped
Primer A: 1.0% DBU in n-heptane
Procedure: 1 dip
Delay: 30 seconds
Primer B: Saturated cyanoacrylate (EZ-Bond Thin Instant Glue) in
n- heptane
Procedure: 1 dip, wipes for cloudy
Delay: 30 seconds
Glue: EZ-Bond CA (5 cps)
Procedure: 1 drop, pressed together by hand for 20 seconds, then clamp
Duration: 30 seconds
Result: Shear Strength = 12.58 MPa

FIG. 3N

140619-10 Material: LDPE, 10 mm x 100 mm strips, MeOH wiped
Primer A: 1.0% DBU in n-heptane
Procedure: 1 dip
Delay: 30 seconds
Primer B: Saturated cyanoacrylate (EZ-Bond Thin Instant Glue) in n-heptane
Procedure: 1 dip, wipes for cloudy
Delay: 30 seconds
Glue: EZ-Bond CA (5 cps)
Procedure: 1 drop, pressed together by hand for 20 seconds, then clamp
Duration: 30 seconds
Result: Shear Strength = 4.71 MPa

FIG. 30

140605-5 Material: Kraton G1657 SEBS elastomer, 1" strips, MeOH wiped
Primer A: 1% DABCO in Acetone
Procedure: 1 dip, 6 wipes
Delay: 30 seconds
Primer B: Saturate cyanoacrylate (EZ-Bond Thin Instant Glue) in n-heptane
Procedure: 1 dip, 6 wipes, then 1+ dip, scrubbed on until almost dry.
Delay: 30 seconds
Glue: E6000
Procedure: Lean coating of glue only, then spring clamp
Result: Peel Strength = 59.7 N

FIG. 4A 140605-8 Material: Santoprene 201-55 elastomer, 1" strips, MeOH wiped
Primer A: 1% DABCO in Acetone
Procedure: 1 dip, 6 wipes
Delay: 30 seconds
Primer B: Saturate (15%) Cyanoacrylate in n-heptane
Procedure: 1 dip, 6 wipes, then 1+ dip, scrubbed on until almost dry.
Delay: 30 seconds
Glue: E6000
Procedure: Lean coating of glue only, then spring clamp
Result: Peel Strength = 31.1 N

FIG. 4B 141015-4 Material: R420/50, 1" strips, IPOH wiped
Glue: OPI Natural Nail Base Coat
Procedure: Thin layers, 140 pounds
Duration: 60 seconds
Result: Peel Strength = 0.37 +/- 0.07 N (24.5 mm overlap)

FIG. 5A 141015-5 Material: R420/50, 1" strips, IPOH wiped
　　　　Primer A: 5% AIP in n-heptane
　　　　Procedure: 1 dip with cotton swab, wiping liberally
　　　　Delay: 60 seconds
　　　　Primer B: Saturate cyanoacrylate (EZ-Bond Thin Instant Glue) in n-heptane
　　　　Procedure: 2 dips with cotton swab, wiping liberally
　　　　Delay: 60 seconds
　　　　Glue: OPI Natural Nail Base Coat
　　　　Procedure: Thin layers, 140 pounds
　　　　Duration: 60 seconds
　　　　Result: Peel Strength = 70.91 +/- 3.19 N (24.9 mm overlap)

FIG. 5B

141015-3 Material: left side of the nail of my left ring finger, acetone cleaned
   Primer A: 5% AIP in n-heptane
   Procedure: 1 dips with cotton swab, wiping liberally
   Delay: 60 seconds
   Primer B: Saturate cyanoacrylate (EZ-Bond Thin Instant Glue) in n-heptane
   Procedure: 1 dip with cotton swab, wiping liberally
   Delay: 60 seconds
   Coating: OPI Natural Nail Base Coat
   Delay: 5 minutes (approx.)
   Coating: OPI Nail Lacquer
   Delay: 5 minutes (approx.)
   Coating: OPI Nail Lacquer
   Delay: 5 minutes (approx.)
   Coating: OPI Top Coat
   Drying: several hours
   Result: Good adhesion of nail polish to nail

Figure 2:
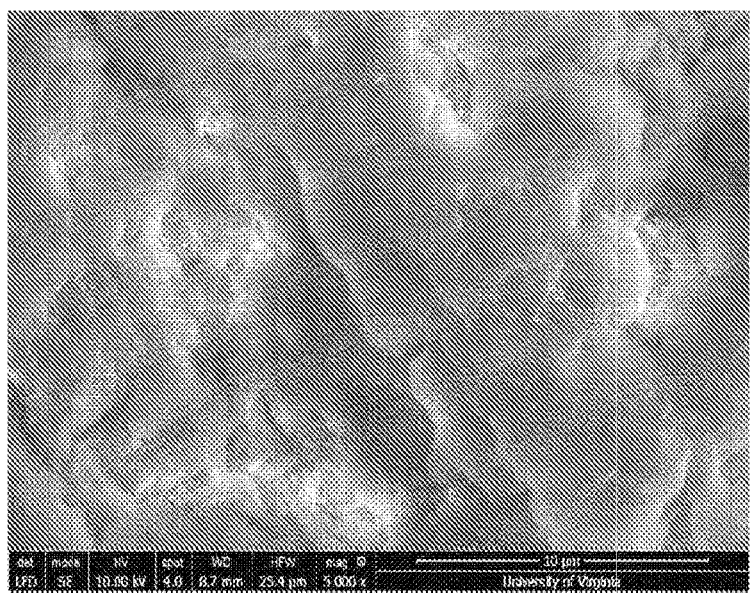

FIG. 6A 141016-2 Material: left side of the nail of my left middle finger, acetone cleaned
Primer A: 0.5% DABCO in acetone
Procedure: 1 dips with cotton swab, wiping liberally
Delay: 60 seconds
Primer B: Saturate cyanoacrylate (EZ-Bond Thin Instant Glue) in n-heptane
Procedure: 1 dip with cotton swab, wiping liberally
Delay: 60 seconds
Coating: OPI Nail Lacquer
Delay: 2 minutes (approx.)
Coating: OPI Nail Lacquer
Delay: 2 minutes (approx.)
Drying: several hours
Result: Good adhesion of nail polish to nail

FIG. 6B

COMPOSITIONS AND METHODS FOR BONDING GLUES, ADHESIVES, AND COATINGS TO SURFACES

I. CLAIM FOR PRIORITY

This application claims benefit of priority of U.S. Provisional Patent Application No. 62/088,728, filed Dec. 8, 2014, which is incorporated herein by reference.

II. TECHNICAL FIELD

The present disclosure is directed to methods and compositions for bonding glues, adhesives, and coatings to surfaces.

III. BACKGROUND ART

One of silicone rubber's most important characteristics is its chemical inertness. Composed primarily of polydimethylsiloxane chains, crosslinked into a solid thermoset elastomer, ordinary silicone rubber is particularly resistant to both chemicals and heat [1] [2]. The stability of silicone rubber is useful in seals, medical devices, and many industrial and consumer applications requiring elastic materials that are unaffected by environment [1]. If something spills on silicone rubber, such a spill can usually be removed by just wiping the spill off the silicone rubber.

Unfortunately, the relative inertness of silicone rubber also makes silicone rubber incompatible with most adhesives and coatings; i.e. most adhesives and coatings peel away easily after application. Silicone rubber has a low-energy surface [3] that is non-polar, non-porous, and lacking in reactive groups, so the silicone rubber surface forms only weak molecular bonds with most materials that try to adhere to the silicone rubber. Generally, glues will not adhere to silicone rubber and paints will not stay on the silicone rubber surface. There are, however, two important exceptions to that non-adhesion rule.

First, silicone adhesives and coatings can adhere to silicone rubber [4]. The high mobility of polydimethylsiloxane molecules permits an uncured reactive silicone fluid to dissolve into a silicone rubber [5] and then crosslink. The resulting interpenetrating polymer network (IPN) binds a first silicone solid to a second silicone solid [6]. Unfortunately, while silicone adhesives and coatings are usually effective on silicone rubbers, silicone adhesives and coatings do not adhere well to many other materials. Furthermore, silicone adhesives and coatings typically cure slowly, often require moisture while curing, have limited cohesive strengths, and may exhibit cure incompatibilities [5] [7].

Second, cyanoacrylate adhesives can adhere to silicone rubber that has been primed with molecules that initiate polymerization of the cyanoacrylate monomer [8] [9] [10]. As cyanoacrylate molecules diffuse into the primed silicone rubber, the cyanoacrylate molecules encounter initiator molecules and form polycyanoacrylate chains that are inextricably entangled with the silicone rubber's polydimethylsiloxane chains. When pressed between two substrates, one or both of which are primed silicone rubber, the cyanoacrylate adhesive hardens in seconds into a rigid or stiff plastic that binds the two substrates firmly together.

Cyanoacrylate bonding of silicone rubber is not without potential problems. Because the bond forms in seconds and is not preceded by preliminary tack or green strength, proper alignment can be difficult. There is frequently a mechanical mismatch between the firm, inextensible polycyanoacrylate bond line and the soft, elastic silicone rubber it bonds. Even with rubber-toughened or semi-flexible cyanoacrylates, the polycyanoacrylate bond line is not an elastomer and imposes its own characteristics on the materials it joins. That bond line will fragment if the materials it joins are stretched significantly.

With such limited choices for bonding and coating silicone rubber, alternative approaches would be valuable. Additionally, low-energy surfaces such as HDPE, LDPE, PTFE, silicones, and many elastomers are notoriously difficult to glue or paint. Most adhesives, inks, coatings, and paints form only weak bonds to low-energy surfaces. Those adhesives and coatings that do bind well to low-energy surfaces are limited and limiting.

There is a long felt need in the art for compositions and methods useful for applying adhesives and coatings to surfaces that do not typically bond well to adhesives and coatings.

IV. SUMMARY OF INVENTION

The present application provides compositions and methods for allowing surfaces such as HDPE, LDPE, polyethylene, polypropylene, Teflon (polytetrafluoroethylene), SBS, SEBS, SIS elastomers, and silicone, which are notoriously difficult surfaces for adhesives, glues, or coatings to attach or adhere to, to be treated with a Primer System that increases the ability of a glue, adhesive, or coating to adhere to that surface and subsequently allows other materials to be used as coatings on the surface or to be applied using a glue or adhesive. In one aspect, the increase is one where a material attaches to the surface where no glue, adhesive, or coating was previously able to attach or adhere well to the surface. In one aspect, there is an increase in the number of glues, adhesives, or coatings that will attach well to a surface where previously at least one glue, adhesive, or coating was able to adhere to the surface. In one aspect, the increase is one where there is an increase in peel strength for a glue, adhesive, or coating that previously was able to attach or adhere to the surface. In one aspect, the increase in adherence is an increase in shear strength. Even on easily bonded substrates, the Primer System can be used to form a high surface-area coating on those substrates.

The compositions and methods of the invention allow for increased adherence of, for example, multiple kinds of glue, multiple kinds of ink, multiple kinds of paint, and multiple kinds of adhesives to bind to surfaces, including low-energy surfaces. The present invention further provides methods for applying the Primer System.

The invention includes methods for applying adhesives, glues, inks, and coatings to the Primer System and methods for applying another material to the adhesive, glue, ink, or coating. In one aspect of the invention, like surfaces are attached or adhered to one another. For example, one aspect of the invention provides for priming a silicone rubber and then adhering a second surface (in some embodiments the second surface is silicone rubber) to the first silicone rubber surface. In another aspect, the two surfaces are not like surfaces. For example, HDPE, LDPE, polyethylene, polypropylene, Teflon (polytetrafluoroethylene), SBS, SEBS, or SIS elastomers, could be attached to a silicone rubber surface using the Primer System of the invention. One of ordinary skill in the art, based on the disclosure herein for successfully using multiple types of surfaces, varied useful Primer formulations, and multiple glues, adhesives, and solvents, will appreciate the number of unlike surfaces that can be successfully treated with the inventive Primer and to practice the inventive methods disclosed herein.

The terms adhesive and glue are used interchangeably herein. As used, the terms are meant to be inclusive as to any definitions of the terms and the intent herein is to be inclusive of all uses of the terms, including natural, synthetic, etc.

The present invention includes a Primer System, comprising Primers A and B. The present invention further includes varied compositions of component molecules for each of the Primers in the system. Primer A comprises molecules that initiate polymerization of at least one of the components of Primer B. In one aspect, the initiator of Primer A is a tertiary amine. In another aspect, the initiator of Primer A is an organometallic. In one aspect, the organometallic is an aluminum organometallic. In one aspect, Primers A and B each further comprise at least one solvent. Primer B comprises a solvent and the present invention includes multiple useful solvents. In one aspect, Primer B comprises (ethyl-2-cyanoacrylate) (ECA). In one aspect, ECA polymerizes when exposed to the initiator of Primer A.

In another embodiment of the invention the procedure and cure time may be modified by varying the temperature while Primers A and B are being added and during the process after both Primers A and B have been added. In one embodiment, once activated Primer B polymerizes on the target surface. In one embodiment, once activated Primer B polymerizes in the surface and forms an interpenetrating polymer network that binds the Primer coating to the target surface.

The present invention further provides kits for using the compositions and methods of the invention. In one aspect, a kit comprises a Primer System of the invention. In one aspect, the Primer System comprises a Primer A and a Primer B, as disclosed herein. In one aspect, the kit further comprises at least one adhesive, glue, coating, or ink that is compatible with the formulations of Primer A and Primer B as provided in the kit. The kit further comprises an instructional material for the use thereof.

The present invention also includes a Primer System that can be used with multiple adhesives, glues, inks, and coatings. In one aspect, cure time will vary depending on the Primer System being used, the temperature, the surface being targeted, and on the particular adhesive, glue, ink, or coating being applied to the surface.

Useful adhesives include, for example, adhesives having multiple components (two part systems, etc). Various aspects and embodiments of the invention are described in further detail below.

In some embodiments, a Primer System comprises a Primer A and a Primer B.

In some embodiments, the Primer A comprises molecules that initiate polymerization of at least one of the components of Primer B.

In some embodiments, once activated, Primer B polymerizes on the target surface.

In some embodiments, once activated, Primer B polymerizes in the target surface and forms an interpenetrating polymer network.

In some embodiments, the Primer A may include an initiator chosen from Lewis bases, photoinitiators, free radical producing species and anion-producing species.

In some embodiments, the Primer A may include an initiator that is chosen from at least one of a tertiary amine and an organometallic.

In some embodiments, the Primer A may include an initiator that is chosen from at least one of 1, 4-diazabicyclo [2.2.2]octane, n, n-dimethyl-p-toluidine, 1, 8-diazabicyclo [5.4.0]undec-7-ene, and tri-n-dodecylamine.

In some embodiments, the Primer A may include an initiator that is chosen from an aluminum organometallic.

In some embodiments, the Primer A may include an initiator that is chosen from at least one of aluminum di(isopropoxide)acetoacetic ester chelate and aluminum isopropoxide.

In some embodiments, the Primer A may include at least one solvent.

In some embodiments, the Primer A may include at least one aprotic solvent.

In some embodiments, the Primer A may include at least one solvent chosen from n-heptane and actetone.

In some embodiments, the Primer A may include an initiator in a concentration of less than about 20 percent by weight.

In some embodiments, the Primer A may include an initiator in a concentration from about 0.2 to about 20 percent by weight.

In some embodiments, the Primer A may include an initiator in a concentration from about 0.2 to about 5 percent by weight.

In some embodiments, Primer B comprises at least one cyanoacrylate monomer.

In some embodiments, at least one cyanoacrylate monomer is chosen from butyl-2-cyanoacrylate, propyl-2-cyanoacrylate, ethyl-2-cyanoacrylate and methyl-2-cyanoacrylate.

In some embodiments, the Primer B may include at least one solvent.

In some embodiments, the at least one solvent included in Primer B is any liquid or mixture of liquids that is chemically compatible with the cyanoacrylate monomer(s).

In some embodiments, the at least one solvent included in Primer B is not miscible with the polymer formed from the monomer(s) in Primer B.

In some embodiments, the at least one solvent included in Primer B does not dissolve significantly (>5%) in the polymer formed from the monomer(s) in Primer B.

In some embodiments, the at least one solvent included in Primer B has a surface tension less than that of toluene.

In some embodiments, the at least one solvent included in Primer B has an affinity for the monomer of Primer B less than that of toluene.

In some embodiments, the at least one solvent included in Primer B does not plasticize the polymer formed by the monomer of Primer B.

In some embodiments, the at least one solvent included in Primer B is chosen from at least one of n-pentane, n-hexane, n-heptane, cyclohexane, and dibutyl ether.

In some embodiments, the component that can be polymerized by Primer A is in a concentration of less than about 50 percent by weight.

In some embodiments, the component that can be polymerized by Primer A is in a concentration from about 0.5 to about 50 percent by weight.

In some embodiments, the component that can be polymerized by Primer A is in a concentration from about 2 to about 20 percent by weight.

In some embodiments, the component that can be polymerized by Primer A is in a concentration from about 7 to about 14 percent by weight.

In some embodiments, the Primer System produces a xerogel that creates the microstructured polymer layer.

In some embodiments, the Primer System is used to adhere at least two surfaces with the use of an adhesive.

In some embodiments, the adhesive does not contain a solvent that is significantly soluble in the microstructured polymer layer.

In some embodiments, at least one surface is a low energy surface.

In some embodiments, the at least one surface being a low energy surface is silicone rubber.

In some embodiments, at least one other surface is not silicone rubber.

In some embodiments, the at least one other surface is HDPE, LDPE, polyethylene, polypropylene, Teflon (polytetrafluoroethylene), SBS, SEBS, or SIS elastomers.

In some embodiments, the Primer System is applied to biological surfaces.

In some embodiments, the Primer System is applied to a biological surface chosen from fingernails, toenails, bone, cartilage, tooth enamel, and skin.

In some embodiments, the Primer System may include a pigment.

In some embodiments, the microstructured polymer layer has greater surface area than the surface that the Primer has been applied to.

In some embodiments, the Primer System increases the ability of a glue, adhesive, or coating to adhere to the application area.

In some embodiments, the Primer System increases material adherence, wherein a material attaches to the surface when no glue, adhesive, or coating was previously able to attach or adhere to the surface.

In some embodiments, the Primer System increases an adherence ability by increasing the peel strength for a glue or adhesive or coating that was previously able to adhere to the surface.

In some embodiments, the Primer System increases an adherence ability by increasing the shear strength for a glue or adhesive or coating that was previously able to adhere to the surface.

In some embodiments, a material may include at least one piece having a microstructured polymer layer, produced by a Primer System that may include Primer A and Primer B.

V. BRIEF DESCRIPTION OF THE DRAWINGS

FIG. 1. is a low-magnification image of the Primer coating obtained by scanning electron microscope and showing the extensive microstructure of that coating.

FIG. 2. is a high-magnification image of the Primer coating, showing some of the microstructure of that coating. Due to the fact that the imaging electron beam melts some of the finest polymer features, the coating actually has more structure than can be seen in this image.

FIGS. 3A-3O describe an exemplary primer system applied to low-energy surfaces.

FIGS. 4A and 4B describe an exemplary primer system applied to thermo-plastic elastomers.

FIGS. 5A and 5B describe an exemplary primer system applied to fingernails.

FIGS. 6A and 6B describe an exemplary primer system applied to fingernails.

VI. DETAILED DESCRIPTION OF EMBODIMENTS

Abbreviations and Acronyms

ADIAEC—aluminum di(isopropoxide)acetoacetic ester chelate
AIP—aluminum isopropoxide
BCA—butyl-2-cyanoacrylate
CA glue—uncured cyanoacrylate glue
DABCO—1,4-diazabicyclo[2.2.2]octane
DBU—1,8-diazabicyclo[5.4.0]undec-7-ene
DMPT—n,n-dimethyl-p toluidine
ECA—ethyl-2-cyanoacrylate
HDPE—high-density polyethylene
IPN—interpenetrating polymer network
LDPE—low-density polyethylene
LLDPE—linear low-density polyethylene
MCA—methyl-2-cyanoacrylate
MDPE—medium-density polyethylene
PCA—propyl-2-cyanoacrylate
PECA—poly(ethyl-2-cyanoacrylate)
PEX or XLPE—cross-linked polyethylene
PP—polypropylene
PTFE—polytetrafluoroethylene (Teflon)
SBC—styrenic block copolymer
SBS—Styrene-Butadiene-Styrene polymer
SEBS—Styrene-Ethylene/Butylene polymers
SEPS—Styrene—Ethylene/Propylene polymers
SIS—Styrene-Isoprene-Styrene polymers
TDA—tri-n-dodecylamine
UHMWPE—ultra-high-molecular-weight polyethylene
VLDPE—very-low-density polyethylene

Definitions

In describing and claiming the invention, the following terminology will be used in accordance with the definitions set forth below. Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described herein. As used herein, each of the following terms has the meaning associated with it in this section. Specific values listed below for radicals, substituents, and ranges are for illustration only; they do not exclude other defined values or other values within defined ranges for the radicals and substituents.

The articles "a" and "an" are used herein to refer to one or to more than one (i.e., to at least one) of the grammatical object of the article. By way of example, "an element" means one element or more than one element.

The term "about," as used herein, means approximately, in the region of, roughly, or around. When the term "about" is used in conjunction with a numerical range, it modifies that range by extending the boundaries above and below the numerical values set forth. For example, in one aspect, the term "about" is used herein to modify a numerical value above and below the stated value by a variance of 20%.

Numerical ranges recited herein by endpoints include all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" unless stated otherwise.

As used herein, an "analog" of a chemical compound is a compound that, by way of example, resembles another in structure but is not necessarily an isomer (e.g., 5-fluorouracil is an analog of thymine).

As used herein, a "derivative" of a compound refers to a chemical compound that may be produced from another compound of similar structure in one or more steps, as in replacement of H by an alkyl, acyl, or amino group.

The use of the word "detect" and its grammatical variants is meant to refer to measurement of the species without quantification, whereas use of the word "determine" or "measure" with their grammatical variants are meant to refer to measurement of the species with quantification. The terms "detect" and "identify" are used interchangeably herein.

As used in the specification and the appended claims, the terms "for example," "for instance," "such as," "including" and the like are meant to introduce examples that further clarify more general subject matter. Unless otherwise specified, these examples are provided only as an aid for understanding the invention, and are not meant to be limiting in any fashion.

The terms "formula" and "structure" are used interchangeably herein.

The term "inhibit," as used herein when referring to a function, refers to the ability of a compound of the invention to reduce or impede a described function.

As used herein, "modification" of a compound refers to a compound that's structure or composition has been somewhat changed from the original compound.

The term "standard," as used herein, refers to something used for comparison. For example, it can be a known standard agent or compound which is administered and used for comparing results when administering a test compound, or it can be a standard parameter or function which is measured to obtain a control value when measuring an effect of an agent or compound on a parameter or function. Standard can also refer to an "internal standard", such as an agent or compound which is added at known amounts to a sample and is useful in determining such things as purification or recovery rates when a sample is processed or subjected to purification or extraction procedures before a marker of interest is measured.

The term "microstructured" as used herein refers to structure that is too small to be seen by the unaided eye. In this way the term is inclusive of structures that occur on the order of microns, and on the order of nanometers.

The general chemical terms used in the description of the compounds of the present invention have their usual meanings. For example, the term "alkyl" by itself or as part of another substituent means a straight or branched aliphatic chain having the stated number of carbon atoms.

In general, "substituted" refers to an organic group as defined herein in which one or more bonds to a hydrogen atom contained therein are replaced by one or more bonds to a non-hydrogen atom such as, but not limited to, a halogen (i.e., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups.

When a substituent is monovalent, such as, for example, F or Cl, it is bonded to the atom it is substituting by a single bond. When a substituent is more than monovalent, such as O, which is divalent, it can be bonded to the atom it is substituting by more than one bond, i.e., a divalent substituent is bonded by a double bond; for example, a C substituted with O forms a carbonyl group, C=O, which can also be written as "CO", "C(O)", or "C(=O)", wherein the C and the O are double bonded. When a carbon atom is substituted with a double-bonded oxygen (=O) group, the oxygen substituent is termed an "oxo" group. When a divalent substituent such as NR is double-bonded to a carbon atom, the resulting C(=NR) group is termed an "imino" group. When a divalent substituent such as S is double-bonded to a carbon atom, the results C(=S) group is termed a "thiocarbonyl" group.

Alternatively, a divalent substituent such as O, S, C(O), S(O), or S(O)$_2$ can be connected by two single bonds to two different carbon atoms. For example, O, a divalent substituent, can be bonded to each of two adjacent carbon atoms to provide an epoxide group, or the O can form a bridging ether group, termed an "oxy" group, between adjacent or non-adjacent carbon atoms, for example bridging the 1,4-carbons of a cyclohexyl group to form a [2.2.1]-oxabicyclo system. Further, any substituent can be bonded to a carbon or other atom by a linker, such as (CH$_2$)$_n$ or (CR'$_2$)$_n$ wherein n is 1, 2, 3, or more, and each R' is independently selected.

C(O) and S(O)$_2$ groups can also be bound to one or two heteroatoms, such as nitrogen or oxygen, rather than to a carbon atom. For example, when a C(O) group is bound to one carbon and one nitrogen atom, the resulting group is called an "amide" or "carboxamide." When a C(O) group is bound to two nitrogen atoms, the functional group is termed a "urea." When a C(O) is bonded to one oxygen and one nitrogen atom, the resulting group is termed a "carbamate" or "urethane." When a S(O)$_2$ group is bound to one carbon and one nitrogen atom, the resulting unit is termed a "sulfonamide." When a S(O)$_2$ group is bound to two nitrogen atoms, the resulting unit is termed a "sulfamate."

Substituted alkyl, alkenyl, alkynyl, cycloalkyl, and cycloalkenyl groups as well as other substituted groups also include groups in which one or more bonds to a hydrogen atom are replaced by one or more bonds, including double or triple bonds, to a carbon atom, or to a heteroatom such as, but not limited to, oxygen in carbonyl (oxo), carboxyl, ester, amide, imide, urethane, and urea groups; and nitrogen in imines, hydroxyimines, oximes, hydrazones, amidines, guanidines, and nitriles.

Substituted ring groups such as substituted cycloalkyl, aryl, heterocyclyl, and heteroaryl groups also include rings and fused ring systems in which a bond to a hydrogen atom is replaced with a bond to a carbon atom. Therefore, substituted cycloalkyl, aryl, heterocyclyl, and heteroaryl groups can also be substituted with alkyl, alkenyl, and alkynyl groups as defined herein.

By a "ring system" as the term is used herein is meant a moiety comprising one, two, three or more rings, which can be substituted with non-ring groups or with other ring systems, or both, which can be fully saturated, partially unsaturated, fully unsaturated, or aromatic, and when the ring system includes more than a single ring, the rings can be fused, bridging, or spirocyclic. By "spirocyclic" is meant the class of structures wherein two rings are fused at a single tetrahedral carbon atom, as is well known in the art.

As to any of the groups described herein, which contain one or more substituents, it is understood, of course, that such groups do not contain any substitution or substitution patterns which are sterically impractical and/or synthetically non-feasible. In addition, the compounds of this disclosed subject matter include all stereochemical isomers arising from the substitution of these compounds.

Selected substituents within the compounds described herein are present to a recursive degree. In this context, "recursive substituent" means that a substituent may recite another instance of itself or of another substituent that itself recites the first substituent. Because of the recursive nature of such substituents, theoretically, a large number may be present in any given claim. One of ordinary skill in the art of medicinal chemistry and organic chemistry understands that the total number of such substituents is reasonably limited by the desired properties of the compound intended. Such properties include, by way of example and not limitation, physical properties such as molecular weight, solubility or log P, application properties such as activity against the intended target, and practical properties such as ease of synthesis.

Recursive substituents are an intended aspect of the disclosed subject matter. One of ordinary skill in the art of medicinal and organic chemistry understands the versatility of such substituents. To the degree that recursive substituents are present in a claim of the disclosed subject matter, the total number should be determined as set forth above.

Alkyl groups include straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed above, for example, amino, hydroxy, cyano, carboxy, nitro, thio, alkoxy, and halogen groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The terms "carbocyclic," "carbocyclyl," and "carbocycle" denote a ring structure wherein the atoms of the ring are carbon, such as a cycloalkyl group or an aryl group. In some embodiments, the carbocycle has 3 to 8 ring members, whereas in other embodiments the number of ring carbon atoms is 4, 5, 6, or 7. Unless specifically indicated to the contrary, the carbocyclic ring can be substituted with as many as N-1 substituents wherein N is the size of the carbocyclic ring with, for example, alkyl, alkenyl, alkynyl, amino, aryl, hydroxy, cyano, carboxy, heteroaryl, heterocyclyl, nitro, thio, alkoxy, and halogen groups, or other groups as are listed above. A carbocyclyl ring can be a cycloalkyl ring, a cycloalkenyl ring, or an aryl ring. A carbocyclyl can be monocyclic or polycyclic, and if polycyclic each ring can be independently be a cycloalkyl ring, a cycloalkenyl ring, or an aryl ring.

(Cycloalkyl)alkyl groups, also denoted cycloalkylalkyl, are alkyl groups as defined above in which a hydrogen or carbon bond of the alkyl group is replaced with a bond to a cycloalkyl group as defined above.

Alkenyl groups include straight and branched chain and cyclic alkyl groups as defined above, except that at least one double bond exists between two carbon atoms. Thus, alkenyl groups have from 2 to about 20 carbon atoms, and typically from 2 to 12 carbons or, in some embodiments, from 2 to 8 carbon atoms. Examples include, but are not limited to: vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

Cycloalkenyl groups include cycloalkyl groups having at least one double bond between 2 carbons. Thus for example, cycloalkenyl groups include but are not limited to cyclohexenyl, cyclopentenyl, and cyclohexadienyl groups. Cycloalkenyl groups can have from 3 to about 8-12 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like, provided they include at least one double bond within a ring.

Cycloalkenyl groups also include rings that are substituted with straight or branched chain alkyl groups as defined above.

(Cycloalkenyl)alkyl groups are alkyl groups as defined above in which a hydrogen or carbon bond of the alkyl group is replaced with a bond to a cycloalkenyl group as defined above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8 carbon atoms. Examples include, but are not limited to —C☐CH, —C☐C(CH$_3$), —C☐C(CH$_2$CH$_3$), —CH$_2$C☐CH, —CH$_2$C☐C(CH$_3$), and —CH$_2$C☐C(CH$_2$CH$_3$) among others.

The term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$CH$_2$—OH, —CH$_2$—CH$_2$—NH—CH$_3$, —CH$_2$—S—CH$_2$—CH$_3$, —CH$_2$CH$_2$—S(═O)—CH$_3$, and —CH$_2$CH$_2$—O—CH$_2$CH$_2$—O—CH$_3$. Up to two heteroatoms may be consecutive, such as, for example, —CH$_2$—NH—OCH$_3$, or —CH$_2$—CH$_2$—S—S—CH$_3$.

A "cycloheteroalkyl" ring is a cycloalkyl ring containing at least one heteroatom. A cycloheteroalkyl ring can also be termed a "heterocyclyl," described below. The term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—CH$_3$, —CH=CH—CH$_2$—OH, —CH$_2$—CH=N—OCH$_3$, —CH=CH—N(CH$_3$)—CH$_3$, —CH$_2$—CH=CH—CH$_2$—SH, and —CH=CH—O—CH$_2$CH$_2$—O—CH$_3$.

Aryl groups are cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined above. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed above.

Aralkyl groups are alkyl groups as defined above in which a hydrogen or carbon bond of an alkyl group is replaced with a bond to an aryl group as defined above. Representative aralkyl groups include benzyl and phenylethyl groups and fused (cycloalkylaryl)alkyl groups such as 4-ethyl-indanyl. Aralkenyl group are alkenyl groups as defined above in which a hydrogen or carbon bond of an alkyl group is replaced with a bond to an aryl group as defined above.

Heterocyclyl groups or the term "heterocyclyl" includes aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those comprising fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed above. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed above.

Heteroaryl groups are aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a C$_2$-heteroaryl can be a 5-ring with two carbon atoms and three heteroatoms, a 6-ring with two carbon atoms and four heteroatoms and so forth. Likewise a C$_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed above.

Representative substituted heteroaryl groups can be substituted one or more times with groups such as those listed above.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f] azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f] azepine-4-yl, 10,11-dihydro-5H-dibenz[b,f]azepine-5-yl), and the like.

Heterocyclylalkyl groups are alkyl groups as defined above in which a hydrogen or carbon bond of an alkyl group as defined above is replaced with a bond to a heterocyclyl group as defined above. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

Heteroarylalkyl groups are alkyl groups as defined above in which a hydrogen or carbon bond of an alkyl group is replaced with a bond to a heteroaryl group as defined above.

The term "alkoxy" refers to an oxygen atom connected to an alkyl group, including a cycloalkyl group, as are defined above. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The terms "halo" or "halogen" or "halide" by themselves or as part of another substituent mean, unless otherwise stated, a fluorine, chlorine, bromine, or iodine atom, preferably, fluorine, chlorine, or bromine.

A "haloalkyl" group includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo, -3,3-difluoropropyl, perfluorobutyl, and the like.

A "haloalkoxy" group includes mono-halo alkoxy groups, poly-halo alkoxy groups wherein all halo atoms can be the same or different, and per-halo alkoxy groups, wherein all hydrogen atoms are replaced by halogen atoms, such as fluoro. Examples of haloalkoxy include trifluoromethoxy, 1,1-dichloroethoxy, 1,2-dichloroethoxy, 1,3-dibromo-3,3-difluoropropoxy, perfluorobutoxy, and the like.

The terms "aryloxy" and "arylalkoxy" refer to, respectively, an aryl group bonded to an oxygen atom and an aralkyl group bonded to the oxygen atom at the alkyl moiety. Examples include but are not limited to phenoxy, naphthyloxy, and benzyloxy.

An "acyl" group as the term is used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 additional carbon atoms bonded to the carbonyl group. An acyl group can include double or triple bonds within the meaning herein. An acryloyl group is an example of an acyl group.

An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "amine" includes primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

An "amino" group is a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

An "ammonium" ion includes the unsubstituted ammonium ion NH$_4^+$, but unless otherwise specified, it also includes any protonated or quaternarized forms of amines. Thus, trimethylammonium hydrochloride and tetramethylammonium chloride are both ammonium ions, and amines, within the meaning herein.

The term "amide" (or "amido") includes C- and N-amide groups, i.e., —C(O)NR$_2$, and —NRC(O)R groups, respectively. Amide groups therefore include but are not limited to primary carboxamide groups (—C(O)NH$_2$) and formamide groups (—NHC(O)H). A "carboxamido" group is a group of the formula C(O)NR$_2$, wherein R can be H, alkyl, aryl, etc.

The term "azido" refers to an N$_3$ group. An "azide" can be an organic azide or can be a salt of the azide (N$_3^-$) anion. The term "nitro" refers to an NO$_2$ group bonded to an organic moiety. The term "nitroso" refers to an NO group bonded to an organic moiety. The term nitrate refers to an ONO$_2$ group bonded to an organic moiety or to a salt of the nitrate (NO$_3^-$) anion.

The term "urethane" ("carbamoyl" or "carbamyl") includes N- and O-urethane groups, i.e., —NRC(O)OR and —OC(O)NR$_2$ groups, respectively.

The term "sulfonamide" (or "sulfonamido") includes S- and N-sulfonamide groups, i.e., —SO$_2$NR$_2$ and —NRSO$_2$R groups, respectively. Sulfonamide groups therefore include but are not limited to sulfamoyl groups (—SO$_2$NH$_2$). An organosulfur structure represented by the formula —S(O)

(NR)— is understood to refer to a sulfoximine, wherein both the oxygen and the nitrogen atoms are bonded to the sulfur atom, which is also bonded to two carbon atoms.

The term "amidine" or "amidino" includes groups of the formula —C(NR)NR$_2$. Typically, an amidino group is —C(NH)NH$_2$.

The term "guanidine" or "guanidino" includes groups of the formula —NRC(NR)NR$_2$. Typically, a guanidino group is —NHC(NH)NH$_2$.

A "salt" as is well known in the art includes an organic compound such as a carboxylic acid, a sulfonic acid, or an amine, in ionic form, in combination with a counterion. For example, acids in their anionic form can form salts with cations such as metal cations, for example sodium, potassium, and the like; with ammonium salts such as NH$_4^+$ or the cations of various amines, including tetraalkyl ammonium salts such as tetramethylammonium, or other cations such as trimethylsulfonium, and the like. Other salt-forming ions include triflate, tosylate, PF$_6^-$, BF$_4^-$, and BPh$_4^-$.

In addition, where features or aspects of the invention are described in terms of Markush groups, those skilled in the art will recognize that the invention is also thereby described in terms of any individual member or subgroup of members of the Markush group. For example, if X is described as selected from the group consisting of bromine, chlorine, and iodine, claims for X being bromine and claims for X being bromine and chlorine are fully described. Moreover, where features or aspects of the invention are described in terms of Markush groups, those skilled in the art will recognize that the invention is also thereby described in terms of any combination of individual members or subgroups of members of Markush groups. Thus, for example, if X is described as selected from the group consisting of bromine, chlorine, and iodine, and Y is described as selected from the group consisting of methyl, ethyl, and propyl, claims for X being bromine and Y being methyl are fully described.

If a value of a variable that is necessarily an integer, e.g., the number of carbon atoms in an alkyl group or the number of substituents on a ring, is described as a range, e.g., 0-4, what is meant is that the value can be any integer between 0 and 4 inclusive, i.e., 0, 1, 2, 3, or 4.

In various embodiments, the compound or set of compounds, such as are used in the inventive methods, can be any one of any of the combinations and/or sub-combinations of the above-listed embodiments.

In various embodiments, a compound as shown in any of the Examples, or among the exemplary compounds, is provided. Provisos may apply to any of the disclosed categories or embodiments wherein any one or more of the other above disclosed embodiments or species may be excluded from such categories or embodiments.

The compounds of the present invention may exist in tautomeric forms and the invention includes both mixtures and separate individual tautomers.

"Substantially," as the term is used herein, means completely or almost completely; for example, a composition that is "substantially free" of a component either has none of the component or contains such a trace amount that any relevant functional property of the composition is unaffected by the presence of the trace amount, or a compound is "substantially pure" is there are only negligible traces of impurities present.

By "chemically feasible" is meant a bonding arrangement or a compound where the generally understood rules of organic structure are not violated; for example a structure within a definition of a claim that would contain in certain situations a pentavalent carbon atom that would not exist in nature would be understood to not be within the claim. The structures disclosed herein, in all of their embodiments are intended to include only "chemically feasible" structures, and any recited structures that are not chemically feasible, for example in a structure shown with variable atoms or groups, are not intended to be disclosed or claimed herein.

When a substituent is specified to be an atom or atoms of specified identity, "or a bond", a configuration is referred to when the substituent is "a bond" that the groups that are immediately adjacent to the specified substituent are directly connected to each other in a chemically feasible bonding configuration.

All chiral, diastereomeric, racemic forms of a structure are intended, unless a particular stereochemistry or isomeric form is specifically indicated. Compounds used in the present invention can include enriched or resolved optical isomers at any or all asymmetric atoms as are apparent from the depictions, at any degree of enrichment.

Both racemic and diastereomeric mixtures, as well as the individual optical isomers can be isolated or synthesized so as to be substantially free of their enantiomeric or diastereomeric partners, and these are all within the scope of the invention.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase).

Specific values listed below for radicals, substituents, and ranges, are for illustration only. They do not exclude other defined values or other values within defined ranges for the radicals and substituents. Specifically, (C$_1$-C$_{12}$)alkyl can be methyl, ethyl, propyl, isopropyl, butyl, iso-butyl, sec-butyl, pentyl, 3-pentyl, hexyl and the like; (C$_3$-C$_{12}$)cycloalkyl can be cyclopropyl, cyclobutyl, cyclopentyl, or cyclohexyl and the like; (C$_3$-C$_{12}$)cycloalkyl(C$_1$-C$_8$)alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl and the like; (C$_1$-C$_{10}$)alkoxy can be methoxy, ethoxy, propoxy, isopropoxy, butoxy, iso-butoxy, sec-butoxy, pentoxy, 3-pentoxy, or hexyloxy and the like; (C$_2$-C$_{12}$)alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl and the like; (C$_2$-C$_{12}$)alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl and the like; (C$_1$-C$_{12}$)alkanoyl can be acetyl, propanoyl or butanoyl and the like; halo(C$_1$-C$_6$)alkyl can be iodomethyl, bromomethyl, chloromethyl, fluoromethyl, trifluoromethyl, 2-chloroethyl, 2-fluoroethyl, 2,2,2-trifluoroethyl, or pentafluoroethyl and the like; hydroxy (C$_1$-C$_{12}$)alkyl can be hydroxymethyl, 1-10 hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl and the like; (C$_1$-C$_{12}$)alkoxycarbonyl can be methoxycarbonyl, ethoxycarbonyl, propoxycarbonyl, isopropoxycarbonyl, butoxycarbonyl, pentoxycarbonyl, or hexyloxycarbonyl and the like; ($C_1$-$C_{12}$)alkylthio can be methylthio, ethylthio, propylthio, isopropylthio, butylthio, isobutylthio, pentylthio, or hexylthio and the like; ($C_2$-$C_{12}$) alkanoyloxy can be acetoxy, propanoyloxy, butanoyloxy, isobutanoyloxy, pentanoyloxy, or hexanoyloxy and the like; ($C_6$-$C_{22}$)aryl can be phenyl, naphthyl, anthrcyl, phenanthryl, pyryl, naphthacyl, pentacyl, or indenyl and the like; and ($C_5$-$C_{13}$)heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide) and the like.

Example 1—Primer System for Bonding Conventional Adhesives and Coatings to Silicone Rubber Disclosed herein is a Primer System that makes silicone rubber compatible with most conventional adhesives and coatings, and thus allows technologies developed for other polymers to be applied with minimal modification to silicone rubber. That Primer System is fast, easy to apply, and inexpensive. Moreover, it has minimal effect on the mechanical properties of the silicone rubber so that two pieces of primed silicone elastomer joined by an elastomeric adhesive will bend and stretch as they did prior to bonding.

In one embodiment, this novel Primer System is based on cyanoacrylates, but not as adhesives. Instead, it uses cyanoacrylates to modify the silicone rubber surface so that other adhesives and coatings can bind strongly to it. Although polymerization is an essential part of the Primer System, the formation of dense macroscopic regions of polycyanoacrylate is undesirable because those regions would stiffen and embrittle the silicone rubber surface. The Primer System therefore produces a microstructured polymer layer that has minimal effect on the mechanical characteristics of the silicone rubber surface and leaves it soft and pliable. Moreover, the highly textured and porous polymer layer allows adhesives and coatings to bind tightly to this exemplary embodiment.

The Primer System has two components, designated Primer A and Primer B. Primer A activates the silicone rubber surface and Primer B forms microstructured polycyanoacrylate in and on that surface. Primer A, the activation component, supplies the silicone surface with molecules that initiate the rapid polymerization of cyanoacrylate monomers in Primer B and thus resembles the conventional Primer step required when cyanoacrylate adhesives are used with silicone rubber.

In this exemplary embodiment, Primer B comprises a cyanoacrylate component, and at least this embodiment is unique to the present work and differs markedly in composition from that of cyanoacrylate adhesives. Concentrated cyanoacrylate monomer, with or without additives, is unsuitable for Primer B because concentrated cyanoacrylate monomers tends to coat the silicone rubber with a relatively thick film of hard, inextensible, and even brittle polycyanoacrylate plastic as the concentrated cyanoacrylate monomer polymerizes. That polycyanoacrylate layer tends to have a dense, glossy or semi-gloss surface to which adhesives and coatings do not adhere well. Moreover, the layer itself does not always bond well to the underlying silicone rubber.

Diluting the cyanoacrylate monomer in a non-reactive solvent can reduce the thickness of the resulting polycyanoacrylate layer; however, thinness alone fails to solve all of its problems. In an exemplary embodiment Primer B also produces a microscopically structured polycyanoacrylate layer that can bend and stretch with the silicone rubber and that binds well to both that silicone rubber and the adhesive or coating above it. To achieve those goals, the solvent used to dilute the cyanoacrylate must be carefully chosen, as described herein.

A "good" solvent—one with a strong affinity for the cyanoacrylate monomer and polymer—turns out to be unsuitable for Primer B. Such a solvent will either dissolve the cyanoacrylate polymer or absorb into it and soften it, neither of which is good for subsequent adhesion. When the solvent can dissolve the polymer, the polymer layer that forms tends to be dense, stiff, and glossy, making it unsuitable for an elastic joint and offering weak binding to adhesives and coatings. When the solvent can absorb into the polymer and soften the polymer, the polymer layer that forms tends to be somewhat porous and flexible, but the polymer layer provides limited grip to adhesives and coatings.

A "poor" solvent—one with a weak affinity for the cyanoacrylate monomer and polymer—is essential to Primer B. Such a solvent can neither dissolve the cyanoacrylate polymer nor absorb into and soften the polymer. The polymer layer that forms from a poor solvent is porous, flexible, and extensible, and adhesives and coatings adhere strongly to its dull, microscopically structured surface. Some of the best Primer B solvents are those in which even the cyanoacrylate monomer itself has limited solubility.

The solvent's inability to dissolve or absorb into the polycyanoacrylate, along with the polycyanoacrylate's high glass transition temperature, means that the polymer stays where it was created in that solvent. As Primer A molecules initiate polymerization and chain formation, a solid polymer gel forms within the dilute monomer solution of Primer B. That polymer retains much of its molecular-scale structure even as the solvent dissipates and the polymer forms a xerogel—a porous solid that forms when a gel's liquid phase is allowed to evaporate from liquid to gas [11]. Firmly rooted in the silicone rubber on which it formed and rich with microstructure to which adhesives can bind, this solid polymer xerogel is an excellent Primer coating.

Experimental

In concept, Primer A, in this exemplary embodiment, supplies the molecules that initiate cyanoacrylate polymerization in and on the silicone rubber surface and Primer B supplies the cyanoacrylate monomer and "poor" solvent that together produce the microstructured polycyanoacrylate Primer layer. In practice, however, learning how to prepare the best Primer layer required exploration and optimization of many separate parameters. The active molecules, solvents, concentrations, and application procedures for both Primers had to be investigated carefully and, to some extent, simultaneously. The work also involved trying different silicone rubbers and a full range of adhesives.

Described herein is an examination of the parameter space around the region in which the Primer System works well. One of ordinary skill in the art will appreciate the full scope of compositions, methods, and applications described in the exemplary embodiments.

For this study, a standard sample was first used, i.e., a specific point in parameter space where the Primer System was observed to work fairly well. Each key parameter of the Primer System was then varied separately and the peel strengths—the tensile force per unit of bond width needed to peel apart an adhesive-bonded pair of silicone rubber strips—were measured. This disclosure summarizes that study and offers insight into how each parameter influences the Primer System's ability to promote adhesion to silicone rubber.

All of the peel-strength measurements were based on the procedure detailed in ASTM D1876-08—Standard Test Method for Peel Resistance of Adhesives (T-Peel Test). Because the work reported here involved many hundreds of separate adhesion experiments, however, practical considerations required several modifications to the ASTM-D1876-08 procedure. First, each peel sample was an adhesive-bonded pair of 25 mm-wide strips, consistent with ASTM-1876-08, but those strips were only 6.25 cm long with 3.75 cm of bonded length, rather than the 30.5 cm-long strips with 24.1 cm of bonded length required by ASTM-D1876-08. Secondly, those bound pairs were prepared individually, rather than six at a time in a large sheet, and they were not always allowed to cure or dry for a full week at a controlled humidity.

Lastly, the peel strengths reported here were obtained by measuring and averaging 3 nominally identical samples, rather than the ten samples specified in ASTM-1876-08. Both the average of the peeling force per unit of bond width and its standard deviation during the peel measurement were obtained for each sample and those values were themselves averaged over the 3 nominally identical samples.

These modifications to ASTM-1876-08 limit the accuracy of the reported values, so they should be treated as meaningfully different only when they differ by about 10% or more. Nonetheless, they are accurate enough to give a clear picture of where the Primer System works well and where it does not.

The standard sample was a preliminary top performer, although it was surpassed frequently in this study. Its Primer A was 0.5 wt % DABCO (1,4-diazabicyclo[2.2.2]octane) in n-heptane, applied twice with a cotton swab: a Q-Tip was dipped once in Primer A for each application to the 2.5 cm×3.75 cm bonding surface of each strip. Its Primer B was saturated (7.5 wt %) ECA (ethyl-2-cyanoacrylate) monomer in n-heptane, applied twice with a cotton swab: a Q-Tip was dipped once in Primer B for each application to each bonding surface, using a fresh Q-Tip each time to avoid contamination of Primer B. Its adhesive was Eclectic E6000, applied thinly to each bonding surface. One of ordinary skill in the art will appreciate that the amounts and concentrations used can be varied depending on the particular surface of interest that is being primed.

The standard sample's silicone rubber was a pair of 2-mm thick strips of Wacker Elastosil R420/50, cured with 0.56 wt % Luperox 101 peroxide. Those strips were lightly cleaned with isopropanol, allowed to dry, and then Primer A was applied to each bonding surface. After waiting 60 seconds, a Primer B was applied to each bonding surface. After waiting another 60 seconds, an adhesive was applied to each bonding surface and the strips were pressed together at 500 kPa for 60 seconds to spread the adhesive uniformly and eliminate trapped air bubbles. That pressure was applied using an arbor press and two aluminum plates, with the press handle weighted to obtain the desired pressure.

After at least 12 hours of drying at room temperature, the peel strength was measured by a custom-built computer-controlled instrument, equivalent to an Instron peel tester. The ends of the two silicone rubber strips were held by cam grips and separated at 10 in/min, while the force required to peel the strips apart was measured by a load cell and recorded as a function of time. The standard sample yielded peel strengths averaging 3.37 N/mm.

Comparable samples were also prepared using conventional silicone and cyanoacrylate adhesive techniques. Sprayon RTV Clear Silicone Sealant, applied to strips of R420/50 silicone rubber and cured for 7 days, yielded peel strengths averaging 1.99 N/mm. EZ-Bond Thin Instant Glue, 5 cps, applied to strips of R420/50 that had been treated with DABCO Primer, yielded peel strengths averaging 4.10 N/mm.

It is interesting to note that, while cotton reacts vigorously with pure cyanoacrylate adhesives, it exhibits no observable reaction with the dilute cyanoacrylate solutions used in Primer B. Substituting polyester swabs or Teflon strips for the cotton swabs had no effect on the measured adhesions.

Varying Primer A

In exemplary embodiments, Primer A rapidly initiated polymerization of polycyanoacrylate monomers, and exemplary molecules have been chosen from a vast assortment of Lewis bases free radical producing species and anion-producing species, many of which have been reported elsewhere [11] [12]. Because an exhaustive search was impractical, earlier work was used as a guide and concentrated on four tertiary amines: DABCO (1,4-diazabicyclo[2.2.2]octane) [13], DMPT (n,n-dimethyl-p-toluidine) [14], DBU (1,8-diazabicyclo[5.4.0]undec-7-ene) [15], and TDA (tri-n-dodecylamine), and two organometallic compounds: AIP (aluminum isopropoxide) [12] and ADIAEC (aluminum di(isopropoxide)acetoacetic ester chelate) [12].

From the multitude of possible solvents, two solvents that are often used in Primers are shown as exemplary embodiments: n-heptane and acetone. N-heptane is non-polar and highly soluble in silicones, so it tends to diffuse rapidly into the silicone rubber surface. Acetone is polar and less soluble in silicones, so it tends to evaporate from the silicone rubber surface.

Samples were made and measured using many different Primer A solutions and one or more dips in those solutions. Apart from the choice of Primer A and its quantity, each sample was prepared exactly as in the standard sample. A representative set of 18 different samples is shown in Table 1.

TABLE 1

The dependence of peel strength on the choice of Primer A

| Sample | Primer A | Quantity | Peel strength (N/mm) Ave | StdDev |
|---|---|---|---|---|
| 1.1 | 1.0% DMPT in n-heptane | 1 dip | 0.26 | 0.05 |
| 1.2 | 1.0% TDA in n-heptane | 1 dip | 2.26 | 0.19 |
| 1.3 | 1.0% DABCO in n-heptane | 1 dip | 3.03 | 0.17 |
| 1.4 | 1.0% DBU in n-heptane | 1 dip | 3.06 | 0.17 |
| 1.5 | 1.0% DABCO in acetone | 1 dip | 3.06 | 0.12 |
| 1.6 | 1.0% DBU in acetone | 1 dip | 3.12 | 0.23 |
| 1.7 | 0.5% DABCO in n-heptane | 1 dip | 2.96 | 0.24 |
| 1.8 | 0.5% DABCO in acetone | 1 dip | 3.32 | 0.25 |
| 1.9 | 2.0% DABCO in n-heptane | 1 dip | 2.91 | 0.13 |
| 1.10 | 2.0% DABCO in acetone | 1 dip | 3.06 | 0.26 |
| 1.11 | 0.5% DABCO in n-heptane | 2 dips | 2.96 | 0.23 |
| 1.12 | 0.5% DABCO in acetone | 2 dips | 3.17 | 0.21 |
| 1.13 | <1.0% AIP in n-heptane (see text) | 1 dip | 2.00 | 0.24 |
| 1.14 | <2.0% AIP in n-heptane (see text) | 1 dip | 2.47 | 0.36 |
| 1.15 | <5.0% AIP in n-heptane (see text) | 1 dip | 3.91 | 0.30 |
| 1.16 | 1.0% ADIAEC in n-heptane | 1 dip | 3.64 | 0.75 |
| 1.17 | 2.0% ADIAEC in n-heptane | 1 dip | 3.99 | 0.24 |
| 1.18 | 5.0% ADIAEC in n-heptane | 1 dip | 3.22 | 0.16 |

Of the tertiary amines, only DMPT (while in n-heptane) (Sample 1.1) failed to work well as the initiator molecule in Primer A. The sample of TDA (1.2) somewhat underperformed the sample of DABCO (1.3) and DBU (1.4), but altering the concentration and solvent of sample 1.2 might bring the performance of sample 1.2 into line with the other two samples. At 1%, DABCO and DBU appeared equally effective in either n-heptane or acetone (1.3-1.6) and varying the concentration of DABCO between 0.5% and 2.0% (1.3, 1.5, 1.7-1.10) or applying two dips of 0.5% DABCO (1.11, 1.12) had no significant effect on performance.

Perhaps the only significant difference observed for DABCO- and DBU-based Primer A solutions was in the solvent choice. Acetone-based Primer A solutions (1.5, 1.6, 1.8, 1.10, 1.12) slightly but consistently outperformed n-heptane-based Primer A solutions (1.3, 1.4, 1.7, 1.9, 1.11).

The two organometallic compounds also performed well as the initiator molecules in Primer A, but showed a significant dependence on concentration. Both AIP and ADIAEC appear to have optimum concentrations at which both samples outperform the tertiary amines. For ADIAEC, that optimum occurs near 2% in n-heptane.

For AIP (aluminum isopropoxide), the optimum concentration is somewhat uncertain. During storage, solid AIP powder undergoes a gradual molecular rearrangement that renders an increasing fraction of the AIP powder insoluble in most solvents. Although 1.0%, 2.0%, and 5.0% AIP were added n-heptane and used as Primer A for Samples 1.13, 1.14, and 1.15 respectively, only about half of the AIP dissolved and the actual AIP concentrations were probably closer to 0.5%, 1.0%, and 2.5% respectively.

Varying Primer B

In an exemplary embodiment, Primer B is a cyanoacrylate solution that polymerizes both in and on the silicone rubber surface. By polymerizing in the silicone rubber surface, Primer B forms an interpenetrating polymer network that binds the Primer coating to the silicone rubber. By polymerizing on the silicone rubber surface, Primer B forms a microstructured polycyanoacrylate layer to which adhesives and coatings can adhere. ECA (ethyl-2-cyanoacrylate) is commonly used in adhesives and is used for the following examples, even though there are a number of commercially important cyanoacrylates. ECA was obtained in bulk, stabilized against premature polymerization, as EZ-Bond Thin Instant Glue, 5 cps.

ECA reacts immediately with water and alcohols, but it is compatible with many aprotic solvents, including those shown in Table 2. ECA is miscible with the polar solvents ($E_T^N \geq 0.071$), but has limited solubility in the non-polar solvents ($E_T^N \leq 0.012$). The polymer PECA (poly(ethyl-2-cyanoacrylate)) is miscible only with the most polar solvents ($E_T^N \leq 0.228$), however, diethyl ether, xylenes, and particularly toluene have significant solubility in PECA. All of the solubility and absorption values in Table 2 were determined experimentally as part of this study.

TABLE 2

Measured solubilities of ECA and PECA in various solvents and of those solvents in PECA (±10%). Also shown is the normalized empirical parameter of solvent polarity $E_T^N$ from Ref. [17] and the surface tension σ at 20° C. from Refs [18], [19].

| Solvent | Solubility (wt %) | | | $E_T^N$ | σ (mN/m) |
|---|---|---|---|---|---|
| | ECA in | PECA in | in PECA | | |
| n-pentane | 11.4 | 0.11 | 0.8 | 0.009 | 16.1 |
| n-hexane | 9.5 | 0.10 | 0.4 | 0.009 | 18.4 |
| n-heptane | 7.5 | 0.05 | 0.4 | 0.012 | 20.1 |
| cyclohexane | 13.6 | 0.10 | 0.7 | 0.006 | 25.2 |
| dibutyl ether | miscible | 0.01 | 0.1 | 0.071 | 22.9 |
| diethyl ether | miscible | 0.10 | 3.0 | 0.117 | 17.1 |
| xylene | miscible | 0.24 | 7.8 | 0.074 | 29.3 |
| toluene | miscible | 0.24 | 21.2 | 0.099 | 28.5 |
| ethyl acetate | | miscible | | 0.228 | 24.1 |
| 1,2-dimethoxyethane | | miscible | | 0.231 | 24.7 |
| acetone | | miscible | | 0.355 | 24.1 |

Uncured cyanoacrylate glue (CA glue) inevitably contains some PECA, even when new, and PECA fraction of the CA glue increases with age. Conveniently for both manufacturers and users, the ECA monomer acts as a solvent for that polymer, helping to keep the CA glue liquid as it ages. The glue remains useable until the accumulated PECA exceeds the monomer's ability to dissolve or adequate plasticize the PECA.

The non-polar solvents in Table 2 exhibit an interesting effect when CA glue is added gradually to those solvents. At first, the CA glue's ECA content goes into solution in the solvent, while CA glues's PECA content is insoluble and precipitates out, typically coating the walls of the container. Eventually, however, the dissolved ECA reaches saturation in the non-polar solvent. When further CA glue is added to this ECA-saturated solution, a liquid phase separation occurs and, at equilibrium, a low-density solvent-rich phase floats on a high-density ECA-rich phase.

The low-density phase is a saturated solution of ECA in solvent, with virtually no dissolved PECA, and it is especially well-suited to use as a Primer B. The high-density phase is a saturated solution of solvent in ECA and of no direct use as a Primer. The high-density phase is, however, an excellent solvent for PECA and tends to accumulate any PECA it encounters. Shaking the container can allow the high-density phase to dissolve PECA on its walls so that, when the phases fully separate again, the phases are clear liquids in a clean container.

In an exemplary embodiment, this self-cleaning effect allows for a self-regulating, self-purifying source of Primer B, wherein Primer B is the low-density solvent-rich phase floating on a high-density ECA-rich phase. Any PECA that forms in that Primer B is quickly sequestered by the high-density phase or the container walls, and ECA is replaced from the ECA-rich high-density phase. Because of this self-regulation, the low-density Primer B phase is virtually unaffected by age, evaporation, and minor contamination, as long as the Primer B phase floats atop a liquid high-density phase.

Samples were made using many different Primer B solutions in place of the one used in the standard sample. Apart from the choice of Primer B solution, each sample was prepared exactly as in the standard sample. A representative set of 13 different samples is shown in Table 3.

TABLE 3

The dependence of peel strength on the choice of Primer B.

| Sample | Primer B | Surface | Peel strength (N/mm) Ave | StdDev |
|---|---|---|---|---|
| 3.1 | 7 wt % ECA in acetone | Gloss | 0.00 | 0.00 |
| 3.2 | 7 wt % ECA in 1,2-dimethoxyethane | Gloss | 0.00 | 0.00 |
| 3.3 | 7 wt % ECA in ethyl acetate | Gloss | 0.00 | 0.00 |
| 3.4 | 7 wt % ECA in toluene | Semi-gloss | 0.08 | 0.01 |
| 3.5 | 100 wt % ECA | Semi-gloss | 0.34 | 0.15 |
| 3.6 | 7 wt % ECA in xylene | Semi-gloss | 0.62 | 0.10 |
| 3.7 | 7 wt % ECA in diethyl ether | Dull | 2.05 | 0.13 |
| 3.8 | Saturated (11.4 wt %) ECA in n-pentane | Dull | 2.37 | 0.14 |
| 3.9 | 7 wt % ECA in dibutyl ether | Dull | 2.50 | 0.12 |
| 3.10 | Saturated (13.6 wt %) ECA in cyclohexane | Dull | 2.53 | 0.16 |
| 3.11 | 7 wt % ECA in cyclohexane | Dull | 2.66 | 0.17 |
| 3.12 | Saturated (9.5 wt %) ECA in n-hexane | Dull | 3.16 | 0.17 |
| 3.13 | Saturated (7.5 wt %) ECA in n-heptane | Dull | 3.33 | 0.23 |

The peel strengths of samples 3.1 through 3.13 were measured and are shown in Table 3. Primer B solutions based on acetone, 1,2-dimethoxyethane, and ethyl acetate (all solvents that are miscible with PECA) produced samples with almost zero peel strength (3.1-3.3). As ECA polymerized in these solvents during use, no phase separation occurred and the PECA remained in the liquid. That PECA-solvent phase was a viscous substance that spread out on the silicone surface but showed little adhesion to it. The liquid phase dried to a glossy PECA film that did not adhere well to either the silicone surface on which it formed or to the adhesive that was subsequently applied to it.

Primer B solutions based on toluene, xylene, and diethyl ether, solvents that are significantly (≥3 wt %) soluble in PECA, produced samples with peel strengths that were poor for toluene (sample 3.4), modest for xylene (sample 3.6), and good for diethyl ether (sample 3.7). As ECA polymerized in these solvents during use, a phase separation occurred and a PECA gel formed on the silicone surface. That gel dried to a xerogel that was well-attached to the silicone, but its performance as an adhesive Primer depended on the solvent. The smaller the solvent's solubility in PECA and the weaker surface tension, the better the performance of the resulting Primer.

Because toluene is very soluble in PECA, toluene plasticizes PECA significantly; large pieces of toluene-soaked PECA have a leathery feel. Toluene also has a large surface tension and subjected PECA to strong capillary stresses as it evaporated. As the gel dried in Sample 3.4, the gel's softened PECA probably compressed into a relatively dense xerogel. The corresponding loss of microstructure would account for the layer's semi-gloss appearance and its poor performance as a Primer.

Although xylene is less soluble in PECA than toluene, xylene is still able to plasticize PECA. Like toluene, xylene has a large surface tension and subjected PECA to strong capillary stresses as the xylene evaporated. As the gel dried in Sample 3.6, its PECA probably compressed significantly and the resulting xerogel lost enough microstructure to give it a semi-gloss appearance and only modest performance as a Primer.

Diethyl ether is even less soluble in PECA than xylene and barely plasticizes the polymer. Moreover, diethyl ether has a small surface tension, so the capillary stresses it exerted on PECA as it evaporated were modest. As the gel in Sample 3.7 dried, the PECA of the gel probably experienced relatively modest compression. The dull appearance of that coating and the coating's good performance as a Primer suggest that the xerogel retained considerable microstructure.

Primer B solutions based on n-pentane, n-hexane, n-heptane, cyclohexane, and dibutyl ether, "poor" solvents that have minimal affinity for PECA, produced samples with large peel strengths (samples 3.8-3.13). Those solvents have small surface tensions and interact weakly with PECA, so they exerted relatively small capillary stresses on unplasticized PECA as they evaporated. Each of these Primer B solutions deposited a gel on the silicone surface during use and that gel dried to a xerogel that retained extensive microstructure, as indicated by those sample's dull appearance and excellent performance as a Primer coating for the adhesive that was then applied. Decreasing the concentration of ECA in cyclohexane from 13.6 wt % (3.10) to 7 wt % (3.11) had no significant effect on peel strength.

A Primer B consisting of 100% ECA (EZ-Bond cyanoacrylate adhesive) was also tried (3.5). That sample formed a thick, brittle, semi-gloss coating on the silicone, with surface characteristics that depended noticeably on the brushing technique used to apply it. Although the finished coating bonded well to the silicone, the adhesive did not bond well the coating, resulting in poor peel strength.

In earlier work, Ito, et al. [13] suggested forming a cyanoacrylate coating on a non-polar or highly crystalline substrate by applying a Primer containing a polymerization initiator followed by a cyanoacrylate monomer or dilute solution of cyanoacrylate monomer in an organic solvent such as toluene or ethyl acetate. Ito, et al. [20] and Hiraiwa, et al. [21] extended that idea by suggesting that the cyanoacrylate monomer could be sprayed onto the surface as a dilute solution in an organic solvent that would prevent the nozzles of the spray gun from clogging. To prevent clogging, that organic solvent had to be capable of dissolving polycyanoacrylate.

As the present work demonstrates, however, cyanoacrylate coatings formed using undiluted cyanoacrylate (3.5) or cyanoacrylate diluted in "good" solvents that dissolve PECA or are relatively soluble in PECA (3.1-3.4) are glossy or semi-gloss and perform poorly as Primers. The best Primer coatings require "poor" solvents with minimal affinities for PECA (3.7-3.13). While those "poor" solvents won't remove PECA from a clogged spray nozzle, dilute solutions of ECA in those solvents conveniently exhibit almost no adhesive character and are far less likely to stick to or clog equipment than undiluted ECA.

Samples were also made using different quantities of Primer B in place of the two dips per strip used in the standard sample. Apart from the amount of Primer B solution applied, each sample was prepared exactly as in the standard sample. Three different samples are shown in Table 4.

TABLE 4

The dependence of peel strength on the quantity of Primer B applied to each silicone strip, using cotton swabs.

| Sample | Primer B Quantity | Peel strength (N/mm) Ave | StDev |
|---|---|---|---|
| 4.1 | 1 dip | 2.94 | 0.20 |
| 4.2 | 2 dips | 3.37 | 0.26 |
| 4.3 | 3 dips | 1.99 | 0.11 |

Although two dips of Primer B (4.2) slightly outperformed one dip (4.1), that difference may have been due to the more uniform coating produced with a second dip of Primer B. A third dip (4.3) significantly diminished the performance of the Primer coating. These results suggest that a thin, but complete coating with Primer B is ideal and that further thicken of the coating is counterproductive. Most likely, there is an optimum thickness for the xerogel layer-thick enough to grip the adhesive, but not so thick that the xerogel is fragile.

Varying Adhesives

Ecletic E6000 adhesive was used in the standard sample because this adhesive was simple to use and dried quickly. The Primer System in various embodiments is useful with other adhesives. One of ordinary skill in the art will appreciate that other adhesives are encompassed by the compositions and methods of the invention.

Samples were made using many different adhesives. Apart from the choice of adhesive and the associated cure time (up to 1 week or more for adhesives that required it), each sample was prepared exactly as in the standard sample. A set of 19 different samples is shown in Table 5.

TABLE 5

Samples produced using different choices of adhesive. In 5.4, the AT-1030 adhesive was allowed to pre-cure for 6 minutes before applying it to the primed silicone.

| Sample | Adhesive | Peel strength (N/mm) Ave | StDev |
|---|---|---|---|
| 5.1 | Weld Mount AT-1030 Two-Part Acrylic | 0.09 | 0.01 |
| 5.2 | Sprayon RTV Clear Silicone Sealant | 0.14 | 0.04 |
| 5.3 | Wacker Elastosil A07 RTV-1 Silicone | 0.23 | 0.02 |
| 5.4 | Weld Mount AT-1030 Two-Part Acrylic (see note) | 0.61 | 0.09 |
| 5.5 | 3M DP-807 Two-Part Acrylic | 0.83 | 0.11 |
| 5.6 | 3M 77 Spray Adhesive | 0.91 | 0.10 |
| 5.7 | 3M 90 Spray Adhesive | 1.14 | 0.13 |
| 5.8 | 3M DP-604 Two-Part Urethane Adhesive | 1.17 | 0.07 |
| 5.9 | 3M 5200 Regular Cure | 1.22 | 0.10 |
| 5.10 | 3M 5200 Fast Cure | 1.40 | 0.10 |
| 5.12 | Sikaflex 221 | 1.46 | 0.11 |
| 5.13 | Elmer's Glue All | 1.51 | 0.09 |
| 5.11 | 3M Scotch-Weld 1357 | 2.54 | 0.18 |
| 5.15 | McNett Aquaseal | 2.92 | 0.37 |
| 5.14 | Devcon 5-minute Epoxy | 3.28 | 0.31 |
| 5.16 | Eclectic E6000 | 3.37 | 0.26 |
| 5.17 | Loctite Epoxy | 3.56 | 0.29 |
| 5.18 | 3M DP-620 Two-Part Urethane Adhesive | 4.15 | 0.25 |
| 5.19 | 3M 4475 Adhesive | 4.37 | 0.21 |
| 5.20 | EZ-Bond CA Glue | 4.69 | 0.20 |

Most of these adhesives bonded strongly to the primed silicone surfaces and exhibited large peel strengths. Above about 4 N/mm, the silicone strips themselves occasionally failed, tearing or snapping during the measurement, but the peel strength values are still reasonably accurate.

Only a few types of adhesives adhered poorly or inconsistently to the Primer coating: silicone adhesives, two-part acrylic adhesives, and Devcon Duco Cement. Of these, silicone adhesives (5.2, 5.3) exhibited the poorest overall performance, a surprising result since silicone adhesives adhere well to untreated silicone. As stated early, silicone adhesives do not adhere well to many materials and do not adhere well to this Primer System.

Two-part acrylic adhesives (5.1, 5.5) yielded surprisingly modest peel strengths given the high tensile strengths of those adhesives. These two-part acrylic adhesives damage the Primer coating before they cure, while they are still thin liquids consisting primarily of methyl methacrylate monomer that can dissolve or soften PECA. To confirm this effect, freshly mixed Weld Mount AT-1030 acrylic adhesive was compared to the same adhesive that had been allowed to pre-cure for 6 minutes prior to use. The freshly prepared adhesive yielded samples (5.1) with almost zero adhesion, while the pre-cured adhesive produced samples (5.4) with reasonable peel strengths.

Devcon Duco Cement produced samples with strikingly inconsistent peel strengths and could not be included in Table 5. Some samples had peel strengths exceeding 4 N/mm, others had peel strengths below 0.2 N/mm, and still others exhibited both behaviors: patches of stunning adhesion interspersed with patches of nearly zero adhesion. Despite considerable effort, a technique that reliably produced high-peel-strength samples was not found.

Like many solvent-based adhesives, Devcon Duco Cement consists primarily of polymers dissolved in organic solvents. Another solvent-based adhesive, 3M 4475 Adhesive, consistently produced samples with enormous peel strengths (5.19). This difference suggests that the solvents in Devcon Duco Cement sometimes ruin the Primer coating whereas the solvents in 3M 4475 Adhesive do not. Evidently, the Primer System works extremely well with solvent-based adhesives, as long as their solvents don't damage the Primer coating before they evaporate.

The Primer coating has no manually discernible effect on the rubber's flexibility or extensibility. Before any adhesive is applied, the Primer-coated silicone rubber can flex and stretch as it did prior to the application of that coating. When a flexible or elastomeric adhesive is then applied, notably 3M 1357 (5.11), the bonded silicone rubber can flex or stretch to the extent allowed by the rubber and the adhesive.

Varying Silicone Rubber

The standard sample (and all the samples above) used Wacker Elastosil R420/50 silicone elastomer because it is strong, and tear-resistant. It survived peel strength measurements on all but the highest peel strength adhesives without breaking or tearing and allowed respectable measurements even when it did tear or break. However, R420/50 is only one of many possible silicone rubbers and only represents one cure technique: peroxide cure. One of ordinary skill in the art will appreciate that other substrates are encompassed by the compositions and methods of the invention. Various embodiments shown here demonstrate the Primer System's performance on other silicone rubbers, particularly with other cure types: addition cure, condensation cure, and moisture cure (one-component RTV).

Samples were made using 2-mm-thick strips of silicones representing the other cure types. Apart from the choice of silicone rubber, each sample was prepared exactly as in the standard sample. Three different samples are shown in Table 6.

TABLE 6

The dependence of peel strength on the choice of silicone rubber.

| Sample | Silicone Rubber | Cure Type | Peel strength (N/mm) Ave | StDev |
|---|---|---|---|---|
| 6.1 | Wacker Elastosil RPlus4000/50 | Addition | 2.66 | 0.13 |
| 6.2 | Bluestar Bluesil V-1065 | Condensation | >1.28 | 0.10 |
| 6.3 | Sprayon RTV Silicone Sealant | Moisture | >1.26 | 0.02 |

The Primer System provided strong adhesion in all three cases. The peel strengths for samples 6.2 and 6.3 are given as lower bounds because the silicone strips always failed soon after the start of the peel measurements. In 6.2, pieces of silicone began tearing out of the surface before one of the strips broke altogether. In 6.3, one of the strips simply snapped very early in the peel process.

Electron Microscopy

The Primer coating, prepared as in the standard sample, was examined using an FEI Quanta 650FEG scanning electron microscope. Images were obtained by scanning the electron beam and detecting secondary electrons with a large-field low-vacuum detector (LFD). With its electron beam operating at 10 kV, this microscope has a spatial resolution of better than 3 nm. At a working pressure of 1 mBar, the microscope can image non-conducting samples, in this case the polycyanoacrylate Primer coating, without requiring any pretreatment.

Scanning electron microscope images of the Primer coating, prepared as in the standard sample, are shown in FIGS. 1 and 2. At the micron scale (FIG. 1), the coating exhibits extensive microstructure with substantial surface area and rich topography, consistent with the Primer coating being a xerogel. At the submicron and nanometer scale (FIG. 2), the coating displays a vast assortment of caverns, pores, and overhangs that can facilitate adhesion, along with patches of polymer floss. Some fibers in that floss are less than 50 nm wide.

To ensure that the images represented the actual structure of the Primer coating, the Primer coating was not modified in any way prior to imaging. The microscope's scanning electron beam encountered the Primer coating itself and the image was formed by collecting secondary electrons emitted by that coating.

Since polycyanoacrylate is an electric insulator and a poor thermal conductor, electric charging and melting complicated the imaging process. Charging of the Primer coating was minimized by operating the microscope at a gas pressure of 1 mBar. Nonetheless, some charging proved unavoidable. The brightening effect seen at several spots in the higher-resolution image (FIG. 2) is a consequence of minor local charging.

Melting of the Primer coating was minimized by reducing the intensity of the electron beam and recording each image with a single scan of a fresh region of Primer coating. Despite these precautions, however, the coating's finest features, notably polymer fibers with nanometer widths, melted during that single scan and were thus difficult to image. FIG. 2 consequently displays somewhat less microstructure than is actually present in the Primer coating.

Discussion of Example 1

A Primer System of the present invention, as described herein, enables a wide variety of adhesives to bond any type of silicone rubber. The only adhesives that fail to work well with the Primer System are silicone adhesives and those adhesives that damage the Primer coating through solvent effects before they dry or cure.

The Primer System comprises two Primers: a Primer A containing molecules that initiate polymerization of ECA and a Primer B containing ECA dissolved in a "poor" solvent for PECA. When this pair of Primers is applied to silicone rubber, the pair produces a microstructured Primer coating in and on the surface of that silicone rubber and nearly any adhesive will adhere strongly to that coating.

Of the 4 tertiary amines and 2 organometallic molecules tested as the initiator in Primer A, only DMPT failed at the task; the others showed excellent performance. The tertiary amines worked well at concentrations of 0.5 wt % to 2.0 wt %, while the aluminum organometallics worked especially well at concentrations of approximately 2.0 wt %. The solvent used in the Primer A appeared to be unimportant, although acetone slightly outperformed n-heptane.

Of the 11+ solvents tried in Primer B, only those that are immiscible with PECA and do not dissolve significantly in PECA produced good Primer coatings. Among the solvents that meet those requirements are ethers, alkanes, and cycloalkanes. Solutions of about 7-14 wt % ECA in those solvents (somewhat limited by saturation) work well as Primer B.

The quantity of Primer B applied to the surface has only a small influence on the resulting peel strength, as long as the Primer coating is complete across the surface and remains thin. The dull, cloudy appearance of the Primer coating makes it visible on the reflective surface of most silicone rubbers, so it is easy to see when the Primer coating first becomes complete as Primer B is applied.

Because ECA is immiscible with alkanes and cycloalkanes, a liquid phase-separation can occur in which the low-density phase is a saturated solution of ECA in solvent and the high-density phase is a solution of solvent and PECA in ECA. The low-density phase makes an excellent Primer B, since its ECA concentration is self-regulating and it is almost free of PECA. Shaking the container and letting it settle can result in a clean container with two clear liquids in the container.

This work has explored only a fraction of the important parameter space and it leaves some important questions unanswered regarding the two Primers and their use with different silicones and different adhesives. Regarding Primer A, there are other initiator molecules and combinations of molecules that deserve study. Matching the best initiator molecules with the best solvents is still a work in progress; for example, ADIAEC is soluble in acetone and that combination could be ideal. More work on AIP solubility and concentration is appropriate.

With Primer B, the full range of the ECA concentrations in "poor" solvents has not been studied rigorously, although preliminary experiments have shown that 5 wt % solutions of ECA work well and even 1 wt % solutions of ECA can produce functional Primer coatings. Other cyanoacrylate monomers and combinations of monomers are envisioned to work in the Primer System, particularly those that form polymers with high glass transition temperatures. Preliminary experiments with solutions of semi-flexible cyanoacrylate adhesives as Primer B have produced samples having poor peel strengths, which suggests that flexible cyanoacrylate polymers lose much of their microstructure as they dry from gels to xerogels [11].

Routine experimentation can determine the simplest implementation of the Primer System that achieves the Primer coating's full performance. A single application of each Primer may well suffice once both Primers are properly formulated and the application process optimized. With the self-regulating Primer B solutions described above, minor contamination of Primer B with Primer A may not matter, so that a single applicator could be used repeatedly to apply Primer B to surfaces containing Primer A.

In addition to adhesives, this Primer System allows paints, inks, and other coatings to adhere to silicone rubber. Preliminary experiments have shown that paints and inks bond tightly to the Primer coating and that pens write as indelibly on the Primer coating as they do on paper.

Lastly, silicone rubbers are not the only materials that present a challenge for adhesives and coatings. Other adhesion-resistant materials include low-surface-energy plastics such as polyethylene (PE, HDPE, and LDPE), polypropylene (PP), and polytetrafluoroethylene (PTFE), thermoplastic elastomers such block copolymers (SBS, SIS, and SEBS), and thermoplastic vulcanizates (PP/EPDM), and biological substrates such as fingernails. Though initially developed for use with silicone rubbers, there is nothing about the Primer System that limits the Primer System to silicone surfaces. If the activator molecules and the cyanoacrylate monomer can diffuse into a surface and polymerize to form an interconnecting polymer network, the Primer System will coat the surface and possibly enhance adhesion. Experiments on all of the hard-to-glue materials noted above demonstrate that the Primer System works well on them and allows almost any adhesive or coating to bind to them tightly.

Example 2—Primer System to Prepare Low-Energy and Other Difficult-to-Bond Surfaces for Adhesives and Coatings The preceding example describes primarily the use of Primers for bonding conventional adhesives and coatings to silicone rubber. The work of Example 1 was extended in this Example to other kinds of surfaces. For example, low-energy surfaces such as HDPE, LDPE, PTFE, silicones, and many elastomers are notoriously difficult to glue or paint. Most adhesives, inks, coatings, and paints form only weak bonds to low-energy surfaces. Those adhesives and coatings that do bind well to low-energy surfaces are limited and limiting. The present example addresses these problems.

In one embodiment, the present invention provides a Primer System for low-energy surfaces that greatly expands the variety of adhesives, inks, coatings, and paints that bind strongly to those surfaces. In one aspect, once a low-energy surface has been treated with this Primer System, almost any adhesive, ink, coating, or paint will adhere well to the surface.

In its basic form according to an embodiment of the invention, the Primer System of the invention comprises two parts, Primer A and Primer B, that are applied sequentially to the low-energy surface. When properly formulated and applied, this Primer System renders the low-energy surface suitable for adhesion. One of ordinary skill in the art will appreciate that the Primers disclosed herein can be modified depending on the target surface being used.

In one aspect, Primer A contains one or more chemical compounds that initiate polymerization of cyanoacrylate monomers. Any cyanoacrylate polymerization initiator(s) known in the art can be used in Primer A. In one aspect, useful initiators include, but are not limited to, the tertiary amines DABCO, DBU, and TDA, and the organometallics AIP and ADIAEC [Aluminum di(isopropoxide)acetoacetic ester chelate] and effective mixtures thereof.

Primer A may also contain a solvent to dilute the polymerization initiator(s), facilitate application of the Primer, and help the initiator(s) penetrate into the low-energy surface. Any solvent(s) known in the art may be used in Primer A. In one aspect, the solvent is an aprotic solvent. Other solvents include, but are not limited to, acetone, n-heptane, n-hexane, n-pentane, and cyclohexane.

In one aspect, Primer B contains one or more cyanoacrylate monomers, dissolved in a suitable solvent. Any cyanoacrylate monomer(s) known in the art to act as an "instant adhesive" or "CA glue" may be used in Primer B. Useful cyanoacrylate monomers include those that polymerize to form polymers that are substantially rigid and have high glass transition temperatures. Useful cyanoacrylate monomers encompassed by the methods of the invention include, but are not limited to, ethyl-2-cyanoacrylate (ECA), methyl-2-cyanoacrylate (MCA), propyl-2-cyanoacrylate (PCA), and butyl-2-cyanoacrylate (BCA).

In one aspect, the solvent in Primer B is any liquid or mixture of liquids that is chemically compatible with the cyanoacrylate monomer(s), that is not miscible with the polymer formed from the cyanoacrylate monomer(s) in Primer B, and does not dissolve significantly (>5%) in that polymer. Additionally, the cyanoacrylate monomer(s) must be sufficiently soluble in the solvent to form a solution of at least about 0.5% cyanoacrylate monomer(s) by weight. In one aspect, useful solvents include alkanes, cycloalkanes, ethers, alkenes, cycloalkenes, and mixtures thereof. Some useful solvents of the invention include n-heptane, n-hexane, n-pentane, cyclohexane, dibutyl ether, and mixtures thereof.

In one embodiment, in addition to comprising polymerization initiator(s) and solvent(s), Primer A can further comprise any substance(s) known in the art to be useful in Primers for the bonding of low-energy surfaces with cyanoacrylate adhesives. Moreover, any Primer known to be useful for bonding low-energy surfaces with cyanoacrylate adhesives is also a potential Primer A for this invention.

In one embodiment, in addition to comprising cyanoacrylate monomer(s) and solvent(s), Primer B can further comprise any substance(s) known in the art to be useful in cyanoacrylate adhesives. Moreover, any cyanoacrylate adhesive is also a potential component of Primer B for this invention. Primer B can be formulated by combining cyanoacrylate adhesive(s) and solvent(s), so long as they are chemically compatible, the solvent(s) is not miscible with the polymer formed from the cyanoacrylate adhesive(s), and the solvent(s) does not dissolve significantly (>5%) in the polymer. Additionally, the cyanoacrylate adhesive(s) must be sufficiently soluble in the solvent(s) to form a solution of at least 0.5% cyanoacrylate monomer(s) by weight.

In one embodiment, Primer A and Primer B can be applied to a low-energy surface using any technique(s) known in the art for applying liquid Primers. In one aspect, Primer A is applied first and Primer B is applied second, although it is anticipated that the reverse ordering or co-application is possible. Because the two Primers react with one another, contamination of Primer B with Primer A should be avoided except during or immediately prior to application. In one aspect, the method comprises applying Primer A to the low-energy surface and then applying Primer B.

In one aspect, Primer A formulations include about 0.2 to about 20 wt % of DABCO, DBU, TDA, AIP, ADIAEC, or mixtures thereof in an aprotic solvent. Useful formulations include, but are not limited to, about 0.2 to about 5 wt % solutions of these compounds in acetone, n-heptane, n-hexane, n-pentane, cyclohexane, and effective mixtures thereof.

In one aspect, Primer B formulations include about 0.5 to about 50 wt % ECA, MCA, PCA, BCA or mixtures thereof dissolved in alkanes, cycloalkanes, ethers, alkenes, cycloalkenes and mixtures thereof. Useful formulations include, but are not limited to, about 2 to about 20 wt % ECA, MCA, PCA, BCA or mixtures in n-heptane, n-hexane, n-pentane, cyclohexane, dibutyl ether, and mixtures thereof.

It is disclosed herein that, because some cyanoacrylate monomer(s) are not miscible with some aprotic solvents, it is possible to form two phase liquid systems in which one phase is solvent-rich and the other phase is cyanoacrylate monomer-rich.

Any cyanoacrylate polymer present in this two-phase system tends to dissolve primarily in the monomer-rich phase or precipitate out of solution altogether. The present application further discloses that the concentration of cyanoacrylate monomer(s) in the solvent-rich liquid phase tends to remain at or very near saturation as long as the monomer-rich phase is in contact with it. Moreover, any cyanoacrylate polymer that forms in the solvent-rich phase tends to precipitate out of solution altogether or be sequestered by the monomer-rich phase.

Consequently, the two-phase system is self-regulating and self-cleaning: the concentration of cyanoacrylate monomer(s) in the solvent-rich phase remains nearly constant and that phase is nearly free from cyanoacrylate polymer. When the solvent is less dense than the cyanoacrylate monomer, the solvent-rich phase is the low-density phase and tends to float on the monomer-rich, high-density phase. The floating behavior makes the solvent-rich, low-density phase easily accessible to use as Primer B in this invention.

In other words, cyanoacrylate monomers are not very soluble in some solvents. When excess cyanoacrylate monomer is added to such a solvent, a liquid-liquid phase separation occurs and the low-density phase tends to float on the high-density phase. When the solvent's density is less than that of the cyanoacrylate monomer, the low-density phase is a saturated solution of monomer in solvent and the high-density phase is a solution of solvent in monomer. It is demonstrated herein that this phase separation is especially interesting for this invention. When Primer B is a low-density, solvent-rich phase and it floats on a high-density, monomer-rich phase, the high-density, monomer-rich phase sequesters any polymer that forms during the preparation, storage, or use of Primer B. This self-cleaning, self-regulating system is even tolerant of minor contamination with compounds that initiate polymerization of the cyanoacrylate monomer(s). Any polymer produced by that contamination is gathered into the high-density phase and new monomer dissolves into the Primer B to replace what was lost to polymerization.

In one aspect, when priming silicone rubber, Primer A is a solution of about 0.2 to about 2.0 wt % DABCO in acetone, n-heptane, n-hexane, n-pentane, or cyclohexane (or mixtures thereof) and Primer B is a saturated solution of ECA, MCA, PCA, BCA, or commercially available low-viscosity cyanoacrylate adhesive (or mixtures thereof) in n-heptane, n-hexane, n-pentane, cyclohexane, or dibutyl ether (or mixtures thereof). In one aspect, adding 0.5 to 10 wt % organometallics such as AIP or ADIAEC to Primer A, or applying them as a separate Primer A', is encompassed by the methods of the invention.

In one aspect, when priming HDPE, LDPE, PP, or PTFE, Primer A is a solution of about 0.2 to about 2.0 wt % DBU in n-heptane, n-hexane, n-pentane, or cyclohexane (or mixtures thereof) and Primer B is a saturated solution of ECA, MCA, PCA, BCA, or commercially available low-viscosity cyanoacrylate adhesive (or mixtures thereof) in n-heptane, n-hexane, n-pentane, cyclohexane, or dibutyl ether (or mixtures thereof).

In another aspect, when priming SIS, SBS, SEBS, dynamic vulcanizates, EPR, and other thermoplastic and thermoset elastomers, Primer A is a solution of about 0.2 to about 2.0 wt % DBU in n-heptane, n-hexane, n-pentane, or cyclohexane (or mixtures thereof) and Primer B is a saturated solution of ECA, MCA, PCA, BCA, or commercially available low-viscosity cyanoacrylate adhesive (or mixtures thereof) in n-heptane, n-hexane, n-pentane, cyclohexane, or dibutyl ether (or mixtures thereof).

The present invention encompasses multiple methods for applying the Primer System. In one aspect, a method for applying the Primer System of the invention is to wipe, paint, or spray Primer A onto the low-energy surface, allow the solvent in Primer A to dissipate, and to wipe, paint, or spray Primer B onto the low-energy surface. In one aspect, application of Primer A is 1 to about 5 complete coatings, so as to ensure uniform distribution of the active compound(s). In one aspect, application of Primer A is 1 to about 3 complete coatings, so as to ensure uniform distribution of the active compound(s). In one aspect, application of Primer A is 1, 2, 3, 4, or 5 complete coatings, so as to ensure uniform distribution of the active compound(s). In one aspect, application of Primer B comprises 1 to about 5 complete coatings, delivered so that polycyanoacrylate forms both in and on the low-energy surface, thereby anchoring the Primer layer in the surface and offering a new surface to which adhesives, inks, paints, and other coatings can adhere strongly. In one aspect, application of Primer B comprises 1, 2, 3, 4, or 5 complete coatings. One of ordinary skill in the art will appreciate that the number of coatings can vary for either Primer A or B depending on such parameters as which formulations of each are being used, the type of surface to which they are being applied, the adhesive being used, and the material which is being used to coat the surface or is to be bonded to the surface using the adhesive and Primer. It will also be appreciated that the same number of coatings do not have to be applied for Primer A and Primer B.

In one aspect, the Primer System of the invention is effective at improving adhesion on many surfaces, whether low-energy or not. Surfaces that benefit from this Primer System include, for example, biological surfaces such as fingernails and toenails. Other biological surfaces include, but are not limited to, bone, cartilage, and tooth enamel. All difficult-to-bond surfaces may benefit from this Primer System.

As described herein, a possible explanation for the strong adhesion this Primer System provides, allowing most adhesives, inks, paints, and other coatings to bind strongly to difficult-to-bond surfaces, is that the system forms polycyanoacrylate polymer that is tightly embedded in the surface and that extends above the surface as a microstructured, microporous, and/or microtextured layer that is particularly well-suited for bonding by adhesives, inks, paints, and other coatings.

Without wishing to be bound by any particular theory as to how the polycyanoacrylate polymer becomes tightly embedded in the surface, it is hypothesized that during the application of Primer B, cyanoacrylate monomer molecules diffuse into the low-energy surface where they are polymerized by initiator compound(s) from Primer A. Once polymerized inside the surface, the resulting polymers are entangled or otherwise entrapped in the surface. The solvent of Primer B may foster the entry of cyanoacrylate monomer(s) into the surface via the energetics and thermodynamics of the monomer/solvent/surface system and/or by the flow of solvent into solution in the surface.

Without wishing to be bound by any particular theory as to how the polycyanoacrylate layer becomes micro-structured, micro-porous, and micro-textured outside the low-energy surface, it is hypothesized herein that the cyanoacrylate monomer polymerizes in the presence of the solvent via a sol-gel process. Because the newly formed polymer is essentially insoluble in the solvent and the solvent is essentially insoluble in the polymer, the polymer remains largely where it formed in the gel. Because of the mutual insolubility of polymer and solvent, the polymer continues to remain largely in place even as the solvent evaporates or otherwise dissipates and the polymer is subject to capillary stresses. When the solvent has a low surface tension and/or a low affinity for the polymer, those capillary stresses may be relatively mild and further aid the retention of microstructure. The gel thus evaporates to a xerogel that retains much of the microscopic structure the polymer had when it was a gel. The xerogel thus has rich microstructure that is extremely well-suited for adhesion.

In one aspect of the invention, when the solvent in Primer B has a low surface tension, has a low affinity for the cyanoacrylate polymer, or for any other reason exerts relatively small capillary stresses on the polymer as the solvent evaporates or otherwise dissipates, the resulting Primer coating is especially well-suited for adhesion.

FIGS. 3A through 6B and the summaries below summarize the advantages and breadth of use of the Primer System encompassed by the present invention.

An Exemplary Primer System Applied to Low-Energy Surface (HDPE, LDPE, and Teflon) is described in detail in FIG. 3A through FIG. 3O.

An Exemplary Primer System Applied to Thermoplastics Elastomers is described in detail in FIGS. 4A and 4B.

An Exemplary Primer System Applied to Fingernails is described in detail in FIGS. 5A and 5B. As demonstrated in FIGS. 5A and 5B, the Exemplary Primer System works for nail polish, allowing nail polish to adhere to difficult-to-bond surfaces, such as silicone.

Another Exemplary Primer System Applied to Fingernails is described in detail in FIGS. 6A and 6B. As demonstrated in FIGS. 6A and 6B, the Exemplary Primer System works for nail polish on nails.

VII. INDUSTRIAL APPLICABILITY

The exemplary disclosed methods and compositions may be applicable for allowing surfaces such as HDPE, LDPE, polyethylene, polypropylene, Teflon (polytetrafluoroethylene), SBS, SEBS, SIS elastomers, and silicone rubber, which are notoriously difficult to apply adhesives, glues, or coatings to, or any other surface, to be treated with a Primer System that increases the ability of a glue, adhesive, or coating to adhere to that surface and subsequently allows other materials to be used as coatings on the surface or to be applied using a glue or adhesive.

VIII. CITATION LIST (PATENT LITERATURE IN BOLD)

[1] C. M. Doede and A. Panagrossi, "Polysiloxane Elastomers," *Industrial and Engineering Chemistry*, vol. 39, no. 11, pp. 1372-1375, 1947.

[2] W. Noll, Chemistry and Technology of Silicones, New York: Academic Press, 1968.

[3] S. Wu, "Surface and Interfacial Tensions of Polymers, Oligomers, Plasticizers, and Organic Pigments," in *Polymer Handbook*, New York, Wiley, 1989, pp. 422-423.

[4] S. Nitzsche and M. Wick, "Silicone Elastomers". U.S. Pat. No. 3,032,528, 1 May 1962.

[5] D. E. Packham, Handbook of Adhesion, Second ed., Chichester: Wiley, 2005.

[6] M. Mazurek, "Silicone Copolymer Networks and Interpenetrating Polymer Networks," in *Silicon-Containing Polymers*, R. G. Jones, W. Ando and J. Chojnowski, Eds., Dordrecht, Kluwer, 2000, pp. 113-137.

[7] W. Brockmann, P. L. Geiß, J. Klingen and B. Schroder, Adhesive Bonding, Weinheim: Wiley-VCH, 2009.

[8] K. Fukuda, A. Okuma and M. Ota, "Primer for alpha-Cyanoacrylate-Base Resin Compositions". U.S. Pat. No. 4,814,427, 21 Mar. 1989.

[9] Henkel Corporation, "Design Guide for Bonding Rubber and Thermoplastic Elastomers," Henkel Corporation Engineering Adhesives, Rocky Hill, 2011.

[10] Yang, Jiyue and A. Garton, "Primers for Adhesive Bonding to Polyolefins," *Journal of Applied Polymer Science*, vol. 48, pp. 359-370, 1993.

[11] P. T. von Bramer, "Method of bonding using Solutions as Catalysts with Alpha-Cyanoacrylate Adhesives". U.S. Pat. No. 3,260,637, 12 Jul. 1966.

[12] K. Ito and K. Kimura, "Primer Composition Useful for Application to Non-Polar on Highly Crystalline Resin Substrates". U.S. Pat. No. 4,822,426, 18 Apr. 1989.

[13] I. I. Kandror, I. O. Bragine, M. A. Galkina, B. D. Lavrukhin and Y. G. Gololobov, "Reaction of alpha-Cyanoacrylic Acid Catalyzed by Tertiary Amines," *Bulletin of the Academy of Sciences of the USSR, Division of Chemical Sciences*, vol. 38, no. 11, pp. 2429-2431, 1989.

[14] W. C. Overhults, "Cross-Linked Cyanoacrylate Adhesive Compositions". U.S. Pat. No. 3,940,362, 24 Feb. 1976.

[15] P. F. McDonnell and B. J. Kneafsey, "Diazabicyclo and Triazabicyclo Primer Compositions and Use Thereof in Bonding Non-Polar Substrates". U.S. Pat. No. 4,869,772, 26 Sep. 1989.

[16] C. Reichardt, Solvents and Solvent Effects in Organic Chemistry, Weinheim: Wiley-VCH, 2003, pp. 418-424.

[17] J. J. Jasper, "The Surface Tension of Pure Liquid Compounds," *J. Phys. Chem. Ref. Data*, vol. 1, no. 4, pp. 841-1009, 1972.

[18] G. Zhao, S. Bi, X. Li and J. Wu, "Surface tension of diethyl carbonate, 1,2-dimethoxyethane and diethyl adipate," *Fluid Phase Equilibria*, vol. 295, pp. 46-49, 2010.

[19] K. Ito and K. Kimura, "Primer Composition Containing an Organometallic Compound for Binding Substrates with a Cyanoacrylate Adhesive". U.S. Pat. No. 5,110,392, 5 May 1992.

[20] A. Hiraiwa, K. Ito and K. Kimura, "Primer Composition". U.S. Pat. No. 5,292,364, 8 Mar. 1994.

The disclosures of each and every patent, patent application, and publication cited herein are hereby incorporated by reference herein in their entirety.

While this invention has been disclosed with reference to specific embodiments, it is apparent that other embodiments and variations of this invention may be devised by others skilled in the art without departing from the true spirit and scope of the invention.

What is claimed is:

1. A primer system for making a surface suitable for adhesion comprising:

a primer A and a primer B;
wherein primer A comprises an initiator chosen from Lewis bases, photo-initiators, free radical producing species, and anion-producing species;
wherein primer B comprises at least one cyanoacrylate monomer and a non-polar solvent, the weight percentage of the at least one cyanoacrylate monomer relative to the entire primer B composition being less than 15% and greater than or equal to at least 0.5%; and
wherein the polymerization of the at least one cyanoacrylate monomer of primer B by the initiator of primer A produces a xerogel that creates a microstructured polycyanoacrylate layer.

2. The primer system of claim 1, wherein the primer system produces a polycyanoacrylate layer on a target surface.

3. The primer system of claim 2, wherein the primer system produces an interpenetrating polymer network in a target surface.

4. The primer system of claim 1, wherein the primer system produces a uniform microstructured polymer layer on a surface.

5. The primer system of claim 1, wherein the primer system produces a flexible and extensible microstructured polymer layer on a surface.

6. The primer system of claim 1, wherein the initiator is chosen from at least one of a tertiary amine and an organometallic.

7. The primer system of claim 6, wherein the initiator is chosen from at least one of 1,4-diazabicyclo[2.2.2]octane, n,n-dimethyl-p-toluidine, 1,8-diazabicyclo [5.4.0]undec-7-ene, and tri-n-dodecylamine.

8. The primer system of claim 6, wherein the initiator is chosen from an aluminum organometallic.

9. The primer system of claim 8, wherein the initiator is chosen from at least one of aluminum di(isopropoxide) acetoacetic ester chelate and aluminum isopropoxide.

10. The primer system of claim 1, wherein the at least one cyanoacrylate monomer is chosen from butyl-2-cyanoacrylate, propyl-2-cyanoacrylate, ethyl-2-cyanoacrylate and methyl-2-cyanoacrylate.

11. A composition comprising:
primer A comprising an initiator chosen from Lewis bases, photo-initiators, free radical producing species, and anion-producing species;
primer B comprising at least one cyanoacrylate monomer and a non-polar solvent, the weight percentage of the at least one cyanoacrylate monomer relative to the entire primer B composition being less than 15% and greater than or equal to at least 0.5%; and
wherein the polymerization of the at least one cyanoacrylate monomer of primer B by the initiator of primer A produces a xerogel that creates a microstructured polycyanoacrylate layer.

12. The composition of claim 11, wherein the composition produces an interpenetrating polymer network in a target surface.

13. The composition of claim 11, wherein the composition produces a uniform microstructured polymer layer on a surface.

14. The composition of claim 11, wherein the composition produces a flexible and extensible microstructured polymer layer on a surface.

15. The composition of claim 11, wherein primer A is chosen from at least one of a tertiary amine and an organometallic, and primer B is chosen from chosen from butyl-2-cyanoacrylate, propyl-2-cyanoacrylate, ethyl-2-cyanoacrylate and methyl-2-cyanoacrylate.

16. A kit comprising a primer system comprising primer A and primer B;
wherein the primer A comprises an initiator chosen from Lewis bases, photo-initiators, free radical producing species, and anion-producing species;
primer B comprises at least one cyanoacrylate monomer and a non-polar solvent, the weight percentage of the at least one cyanoacrylate monomer relative to the entire primer B composition being less than 15% and greater than or equal to at least 0.5%; and
wherein the polymerization of the at least one cyanoacrylate monomer of primer B by the initiator of primer A produces a xerogel that creates a microstructured polycyanoacrylate layer.

17. The kit of claim 16, wherein the kit includes instructions to dilute primer B to a concentration from about 0.5 to about 50 percent by weight and to apply the primer system to a surface.

18. The kit of claim 17, wherein primer A is chosen from at least one of a tertiary amine and an organometallic, and primer B is chosen from chosen from butyl-2-cyanoacrylate, propyl-2-cyanoacrylate, ethyl-2-cyanoacrylate and methyl-2-cyanoacrylate.

* * * * *